(12) United States Patent
Uemura et al.

(10) Patent No.: US 8,625,540 B2
(45) Date of Patent: Jan. 7, 2014

(54) MOBILE COMMUNICATION SYSTEM, BASE STATION DEVICE, MOBILE STATION DEVICE, AND MOBILE COMMUNICATION METHOD

(75) Inventors: Katsunari Uemura, Osaka (JP); Hidekazu Tsuboi, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 12/865,812

(22) PCT Filed: Jan. 26, 2009

(86) PCT No.: PCT/JP2009/051182
§ 371 (c)(1),
(2), (4) Date: Aug. 2, 2010

(87) PCT Pub. No.: WO2009/098960
PCT Pub. Date: Aug. 13, 2009

(65) Prior Publication Data
US 2011/0013592 A1    Jan. 20, 2011

(30) Foreign Application Priority Data
Feb. 4, 2008   (JP) ................ P2008-024400

(51) Int. Cl.
*H04W 4/00*   (2009.01)

(52) U.S. Cl.
USPC ............................ 370/332; 455/443; 455/422

(58) Field of Classification Search
USPC ......... 370/329, 330, 331, 332, 333, 334, 335, 370/336; 455/432.1, 436, 437, 438, 439, 455/442, 443, 450
See application file for complete search history.

(56) References Cited

U.S. PATENT DOCUMENTS 6,449,482 B1 *  9/2002  Johansson et al. ............ 455/443

6,859,654 B1     2/2005  Reynolds et al.
2007/0287501 A1  12/2007  Hoshina et al.

FOREIGN PATENT DOCUMENTS

| EP | 1732269 A1 | 12/2006 |
|---|---|---|
| JP | 11-505980 A | 5/1999 |
| JP | 2002-509407 A | 3/2002 |
| WO | WO 96/38014 A1 | 11/1996 |
| WO | WO 99/31918 A1 | 6/1999 |
| WO | WO 2007/124451 A2 | 11/2007 |

OTHER PUBLICATIONS

3GPP TS 36.211 V8.0.0 (Sep. 2007), 3rd Generation Partnership Project; Technical Specification Group Radio Access Network; Evolved Universal Terrestrial Radio Access (E-UTRA); Physical channels and modulation (Release 8), pp. 1-50, http://www.3gpp.org/ftp/Specs/html-info/36211.htm).

(Continued)

*Primary Examiner* — Huy D. Vu
*Assistant Examiner* — Dady Chery
(74) *Attorney, Agent, or Firm* — Slater & Matsil, L.L.P.

(57) ABSTRACT

A mobile communication system includes a mobile station device and a base station device. The base station device includes a cell identification information transmission unit which transmits cell identification information of base station devices transmitting radio signals of the same synchronization channel, to the mobile station device when there are at least two base station devices transmitting radio signals of the same synchronization channel within a predetermined communication area. The mobile station device includes a measurement result transmission unit which performs a measurement process based on the cell identification information of the base station devices and transmits the measurement result acquired by the measurement process to the base station device.

9 Claims, 19 Drawing Sheets

(56) References Cited

OTHER PUBLICATIONS

3GPP TS 36.300 V8.3.0 (Dec. 2007), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-120, http://www.3gpp.org/ftp/Specs/html-info/36300.htm.
Dahlman et al., "3G Evolution HSPA and LTE for Mobile Broadband", Elsevier Ltd., LTE access procedures, pp. 357-359.
Ericsson, "On Automatic Neighbour Relation Configuration", R3-071819, 3GPP TSG RAN WG3 Meeting #57bis, Oct. 8-11, 2007, Sophia Antipolis, France, pp. 1-3.
Ericsson, "UE measurements and reporting of Global Cell Identity", R2-072674, 3GPP TSG-RAN WG2 #58bis, Orlando, USA, Jun. 25-29, 2007, pp. 1-2.
Huawei, "Bad Neighbours", R3-071961, 3GPP TSG RAN3 #57bis, Sophia Antipolis, France, Oct. 8-11, 2007, pp. 1-4.
Huawei, "Detection of conflicting cell identities", R3-071947, 3GPP TSG RAN WG3 Meeting #57bis, Sophia Antipolis, France, Oct. 8-11, 2007, pp. 1-3.
Vodafone Group, "Measurement Control in LTE_ACTIVE state (for CSG Cells)", R2-072829, 3GPP TSG RAN WG2 #58bis, Orlando, US, Jun. 25-29, 2007, pp. 1-2.
Ericsson, "Automatic neighbour cell configuration," 3GPP TSG RAN WG3 Meeting #57, R3-071494, Athens, Greece, Aug. 20-24, 2007, 5 pages, XP050162315.
Ericsson, "MCI conflict detection and resolution," 3GPP TSG-SA5 (Telecom Management), Meeting SA5#55, S5-071569, Aug. 27-31, 2007, Bucharest, Romania, 4 pages, XP050306211.
Qualcomm Europe and T-Mobile, "Inter-RAT/frequency Automatic Neighbour Relation Function," 3GPP TSG RAN2#60, R2-074907, Jeju, South Korea, Nov. 5-9, 2007, 6 pages, XP050137407.
Supplementary European Search Report, mailed Apr. 20, 2012, for European Application No. 09708983.3.
Revised Supplementary European Search Report dated Jun. 28, 2012 for European Application No. 09708983.3.

\* cited by examiner

FIG. 10A

| MEASUREMENT REPORT MESSAGE | 1 | CID_A |
| | | QUALITY INFORMATION_A |
| | 2 | CID_B |
| | | QUALITY INFORMATION_B |
| | 3 | CID_C |
| | | QUALITY INFORMATION_C |
| | 4 | CID_D |
| | | QUALITY INFORMATION_D |
| | ... | ... |

FIG. 10B

| MEASUREMENT REPORT MESSAGE | 1 | CID_A |
| | | QUALITY INFORMATION_A |
| | 2 | CID_B |
| | | GCID_B |
| | | QUALITY INFORMATION_B |
| | 3 | CID_B |
| | | GCID_C |
| | | QUALITY INFORMATION_C |
| | 4 | CID_D |
| | | QUALITY INFORMATION_D |
| | ... | ... |

FIG. 11A

| HANDOVER COMMAND MESSAGE | FREQUENCY INFORMATION |
| --- | --- |
| | CID_B |
| | PREAMBLE INFORMATION |
| | HANDOVER EXECUTION TIME |
| | UPLINK TRANSMISSION TIMING |
| | ... |

FIG. 11B

| HANDOVER COMMAND MESSAGE | FREQUENCY INFORMATION |
| --- | --- |
| | CID_B |
| | GCID_B |
| | PREAMBLE INFORMATION |
| | HANDOVER EXECUTION TIME |
| | UPLINK TRANSMISSION TIMING |
| | ... |

MOBILE COMMUNICATION SYSTEM, BASE STATION DEVICE, MOBILE STATION DEVICE, AND MOBILE COMMUNICATION METHOD

TECHNICAL FIELD

The present invention relates to a mobile communication system, a base station device, a mobile station device, and a mobile communication method.

This application claims priority to and the benefits of Japanese Patent Application No. 2008-024400 filed on Feb. 4, 2008, the disclosure of which is incorporated herein by reference.

BACKGROUND ART

Recently, Evolved Universal Terrestrial Radio Access (hereinafter, referred to as "EUTRA") aimed at high speed communication has been examined by a standardized group, 3rd Generation Partnership Project (3GPP), by introducing technology examined for a 4th generation frequency bandwidth into a 3rd generation frequency bandwidth (Non-Patent Document 1).

In EUTRA, as a communication method, Orthogonal Frequency Division Multiplexing Access (OFDMA) is used. OFDMA is a communication method which is strong against multi-path interference and suitable for high speed transmission. In addition, a specification for an operation of an upper layer in EUTRA includes low latency and low overhead and simplified technology is being employed. The operation of the upper layer includes data transmission control, resource management control, and so on.

In a cellular mobile communication method, a mobile station device needs to be wirelessly synchronized with a base station device in advance in a cell or a sector. For this reason, the base station device transmits a synchronization channel (SCH) having a defined structure to the mobile station device. Then, the mobile station device is synchronized with the base station device by detecting the synchronization channel (SCH). The cell or the sector is a communication area of the base station device.

In EUTRA, as the synchronization channel (SCH), a P-SCH (primary SCH, primary synchronization channel) and an S-SCH (secondary SCH, secondary synchronization channel) are prepared. Each cell (or sector) is identified by the mobile station device by the use of a cell ID determined by the signals of the primary synchronization channel (P-SCH) and the secondary synchronization channel (S-SCH).

The cell ID is determined by a combination of 3 types of primary synchronization channels (P-SCHs) and 168 types of secondary synchronization channels (S-SCHs), for a total of 504 (3×168=504).

FIG. 16 is a flowchart showing a process in a conventional cell search method.

The mobile station device performs a P-SCH identification process by correlating a replica signal of a primary synchronization channel (P-SCH) with a received signal. Accordingly, the mobile station device acquires slot timing (step S1).

The mobile station device then performs an S-SCH identification process by correlating a replica signal of a secondary synchronization channel (S-SCH) with the received signal. Accordingly, the mobile station device acquires frame timing by an acquired transmission pattern of the secondary synchronization channel (S-SCH). In addition, the mobile station device acquires a cell identification (ID) for identifying the base station device (step S2).

Such a series of control, that is, a step control up to the mobile station device executing wireless synchronization with the base station device and specifying the cell ID of the base station device is referred to as a cell search procedure.

In a cellular mobile communication method including EUTRA, a mobile station device communicates with a base station device within a cell (or a sector) that is a communication area of the base station device. When the mobile station device is wirelessly connected to a certain base station device, a cell where the mobile station device is located is referred to as a serving cell. Meanwhile, a cell located around the serving cell is referred to as a neighboring cell.

The mobile station device can determine a cell having a satisfactory quality by measuring and comparing the reception qualities of the serving cell and the neighboring cell. A process in which the mobile station device moves from the serving cell to the neighboring cell to change a cell to which the mobile station device is wirelessly connected is referred to as a handover.

In this case, a signal used for the mobile station device to determine the levels of reception qualities of cells is referred to as a downlink reference signal. The downlink reference signal is a predetermined signal sequence corresponding to a cell ID. That is, it is possible to uniquely specify a downlink reference signal simultaneously transmitted from a cell by identifying a cell ID of the cell (Non-Patent Document 1).

FIG. 17 is a diagram showing an example of a configuration of a radio frame in EUTRA. In FIG. 17, the horizontal axis indicates time, and the vertical axis indicates frequency. The radio frame consists of an area (a shaded area of FIG. 17) including a predetermined frequency area (BR) and a predetermined transmission time interval (slot) as one unit (Non-Patent Document 1). The frequency area (BR) is the assembly of a plurality of sub-carriers arranged on the frequency axis.

The transmission time interval consisting of the integer times of one slot is referred to as a sub-frame. A combination of a plurality of sub-frames is referred to as a frame. In FIG. 17, one sub-frame consists of two slots.

An area (the shaded area of FIG. 17) divided by the predetermined frequency area (BR) and the length of one slot is referred to as a resource block. In addition, one frame consists of 10 sub-frames. BW of FIG. 17 indicates a bandwidth of a system, and BR indicates a bandwidth of the resource block.

FIG. 18 is a flowchart showing a handover procedure used in EUTRA. FIG. 18 shows a control operation in which the mobile station device communicates with a cell of a handover source (hereinafter, referred to as a source cell), and a handover to a cell of a handover destination (hereinafter, referred to as a neighboring cell) is performed.

The following procedure will be described on the assumption that the cell ID of the source cell is CID_A, and the cell ID of the neighboring cell is CID_B. Here, the mobile station device receives each of the downlink reference signals of the CID_A and the CID_B from each of the base station device having the cell ID of CID_A and the base station device having the cell ID of CID_B (steps S001 and S002). Then, the mobile station device measures the reception quality acquired from each of the downlink reference signals.

The mobile station device then performs a measurement report process (step S003). That is, the base station device having the cell ID of CID_A is notified of the measurement result of the mobile station device as a measurement report message (step S004). The base station device having the cell ID of CID_A determines whether the handover to the base station device having the cell ID of CID_B is necessary based on the contents of the measurement report message. When it is determined that the handover is necessary, the base station device having the cell ID of CID_A notifies the mobile station device of the necessity of the handover to the base station device having the cell ID of CID_B using a handover request message (step S005), and requests the preparation for the handover.

When it is determined that the handover can be performed, the base station device having the cell ID of CID_B that has received the handover request message notifies the base station device having the cell ID of CID_A of a handover request permission message (step S006).

The base station device having the cell ID of CID_A that has received the handover request permission message notifies the mobile station device of a handover command message (referred to as a handover command) (step S007).

When the mobile station device receives the message, the handover process starts (step S008). When a handover execution time is included in the handover command message, the mobile station device performs the handover when the handover execution time lapses.

In some cases, immediate execution may be designated as the handover execution time. The mobile station device changes a control parameter of a transmission/reception circuit or a radio frequency designated by the handover command message at the handover execution time. Subsequently, the mobile station device performs a downlink synchronization setup process for setting up downlink wireless synchronization with the base station device having the cell ID of CID_B (handover process).

The control parameter for the downlink synchronization setup process is included in the prior handover command message, or the mobile station device is informed or notified thereof in advance by the cell having the cell ID of CID_A. After the downlink synchronization setup is completed, the mobile station device performs a random access transmission so as to set up uplink synchronization with the cell having the cell ID of CID_B (step S009). This process may be called a handover access.

In fact, the random access is performed by using a (contention-based) channel which may cause conflict. However, a method is proposed which allocates a preamble sequence (dedicated preamble) in the handover command message to each mobile station device in advance, for the purpose of the (contention-free) random access transmission not causing conflict (Non-Patent Document 2).

The mobile station device performs the random access transmission using the preamble sequence designated in the handover command message. The base station device having the cell ID of CID_B that has received the preamble sequence determines that the handover of the corresponding mobile station device is completed. Then, the base station device having the cell ID of CID_B notifies the mobile station device of uplink resource allocation information for transmitting a handover completion message (which may be called a handover confirm) and uplink synchronization information for adjusting the uplink transmission timing (step S010).

The mobile station device adjusts the uplink transmission timing based on the above-described information, transmits the handover completion message to the base station device having the cell ID of CID_B using the designated uplink resource, and then completes the handover (step S011).

In addition, whether the downlink reference signal is described as downlink reference signal (Reference signal) or DL-RS (Downlink Reference signal) in Non-Patent Document 1, the meaning is the same.

However, in the cell search procedure and the handover procedure of the conventional art, when the same cell ID is allocated to the base station device, that is, a plurality of base station devices having the same primary synchronization channel (P-SCH) and secondary synchronization channel (S-SCH) are in an area, it is not possible to guarantee the operation of the mobile station device in that area. This will be described with reference to FIG. 19.

FIG. 19 is a flowchart showing the handover procedure when the same cell ID is measured by the mobile station device. FIG. 19 shows a case where the conflicting cell having the same cell ID (CID_B) as the neighboring cell of FIG. 18 is in the same area.

Here, the mobile station device receives the downlink reference signal from each of the source cell (CID_A), the neighboring cell (CID_B), and the conflicting cell (CID_B) (steps S020, S021, and S022). Then, the mobile station device measures the reception quality acquired from each of the downlink reference signals.

However, in the cell search procedure of the conventional art, since the mobile station device can detect only 2 types of cell IDs of CID_A and CID_B, the mobile station device cannot recognize if there are two cells having the same cell ID (CID_B).

For this reason, the downlink reference signals of the neighboring cell (CID_B) and the conflicting cell (CID_B) are measured without distinguishing them, and the CID_A is notified of the measurement report message (step S024) according to the measurement report process (step S023).

That is, when the neighboring cell (CID_B) and the conflicting cell (CID_B) are synchronized, the synthesized downlink reference signal is measured in the mobile station device. In addition, when the neighboring cell (CID_B) and the conflicting cell (CID_B) are not synchronized, one of the downlink reference signals is determined as a delay wave in the mobile station device.

In the state where the cell IDs conflict with each other as shown in FIG. 19, a plurality of problems arise. For example, the source cell (CID_A) cannot recognize whether the reception quality of the CID_B cell included in the measurement report message from the mobile station device belongs to the neighboring cell (CID_B) or the conflicting cell (CID_B).

In addition, when it is reported that the reception quality of the CID_B cell is acquired by synthesizing the reception qualities of the neighboring cell (CID_B) and the conflicting cell (CID_B), the reception quality cannot be suitably used for the handover reference. Further, even when the source cell (CID_A) transmits the handover command message to the neighboring cell (CID_B) to the mobile station device, it is not possible to clearly designate the neighboring cell (CID_B) as the cell of the handover destination. Accordingly, there is a possibility of the mobile station device executing the handover to the conflicting cell (CID_B).

In Non-Patent Document 3, in order to solve the problem caused by the same cell IDs, a method is disclosed in which unique IDs (Global Cell Identity, hereinafter, referred to as "GCID") prepared sufficiently more than at least 504 types of cell IDs are allocated to all cells together with the cell IDs.

Because of using the GCID, it is possible to identify conflicting cells that cannot be identified by only the cell ID, using the GCID. In addition, by designating the cell of the handover destination using the GCID in the handover command message, it is possible to clearly designate the cell of the handover destination of the mobile station device.

In the method using the GCID shown in Non-Patent Document 3, even when the same cell ID is allocated to at least two cells (conflicting cells) in the measurement area, the mobile station device needs to autonomously identify the conflicting cell based on the synchronization channel (SCH) and the downlink reference signal.

However, it is difficult for the mobile station device to autonomously detect the allocation of the same cell ID, and divide and receive each of the radio signals.

For this reason, when there is a conflicting cell, a problem arises in that the process in the communication between the mobile station device and the base station device becomes complicated.

Non-Patent Document 1: 3GPP TS (Technical Specification) 36.211, Physical Channels and Modulation. V8.0.0 (http://www.3gpp.org/ftp/Specs/html-info/36211.htm)

Non-Patent Document 2: 3GPP TS 36.300, Overall description; Stage 2.V8.3.0 (http://www.3gpp.org/ftp/Specs/html-info/36300.htm)

Non-Patent Document 3: Huawei, "Detection of conflicting cell identities", R3-071947, 3GPP TSG-RAN WG3 Meeting #57 bis, Sophia Antipolis, France, 8-11 Oct. 2007

DISCLOSURE OF INVENTION

Problem to be Solved by the Invention

It is an object of the present invention to provide a mobile communication system, a base station device, a mobile station device and a mobile communication method capable of simplifying a process in the communication between the mobile station device and the base station device even when there are conflicting cells.

Means for Solving the Problem (1) The present invention has been made to solve the above-described problems. According to an aspect of the present invention, there is provided a mobile communication system including a mobile station device and a base station device, wherein the base station device includes a cell identification information transmission unit which transmits cell identification information of base station devices transmitting radio signals of the same synchronization channel, to the mobile station device when there are at least two base station devices transmitting radio signals of the same synchronization channel within a predetermined communication area, and the mobile station device includes a measurement result transmission unit which performs a measurement process based on the cell identification information of the base station devices and transmits the measurement result acquired by the measurement process to the base station device.

(2) In addition, in the mobile communication system according to the aspect of the present invention, the cell identification information of the base station device is cell identification information specified by a combination of a primary synchronization channel and a secondary synchronization channel.

(3) In addition, in the mobile communication system according to the aspect of the present invention, the cell identification information of the base station device includes cell identification information specified by a combination of a primary synchronization channel and a secondary synchronization channel, and global cell identification information uniquely allocated to each cell.

(4) In addition, in the mobile communication system according to the aspect of the present invention, the cell identification information of the base station device is transmitted to the mobile station device using a handover command message.

(5) In addition, in the mobile communication system according to the aspect of the present invention, the measurement process in the mobile station device includes a measurement result for cells other than cells designated by the cell identification information of the base station device.

(6) In addition, in the mobile communication system according to the aspect of the present invention, the measurement process in the mobile station device includes acquiring broadcast information of a base station device having global cell identification information designated by the cell identification information of the base station device, and identifying each of at least two base station devices transmitting the radio signals of the same synchronization channel.

(7) In addition, according to another aspect of the present invention, there is provided a mobile communication system including a mobile station device and a base station device, wherein the base station device includes a cell identification information transmission unit which transmits a handover command message including cell identification information of base station devices transmitting radio signals of the same synchronization channel, to the mobile station device when there are at least two base station devices transmitting radio signals of the same synchronization channel within a predetermined communication area, and the mobile station device includes a handover processing unit which acquires broadcast information of a base station device having global cell identification information designated by the cell identification information of the handover command message, identifies the global cell identification information of at least two base station devices transmitting the radio signals of the same synchronization channel, and then starts a handover procedure.

(8) In addition, according to another aspect of the present invention, there is provided a base station device which communicates with a mobile station device, the base station device including: a cell identification information transmission unit which transmits cell identification information of base station devices transmitting radio signals of the same synchronization channel, to the mobile station device when there are at least two base station devices transmitting radio signals of the same synchronization channel within a predetermined communication area.

(9) In addition, according to an aspect of the present invention, there is provided a mobile station device which communicates with a base station device, the mobile station device including: a measurement result transmission unit which performs a measurement process based on cell identification information of the base station device and transmits the measurement result acquired by the measurement process to the base station device.

(10) In addition, according to another aspect of the present invention, there is provided a base station device which communicates with a mobile station device, the base station device including: a cell identification information transmission unit which transmits a handover command message including cell identification information of base station devices transmitting radio signals of the same synchronization channel, to the mobile station device when there are at least two base station devices transmitting radio signals of the same synchronization channel within a predetermined communication area.

(11) In addition, according to another aspect of the present invention, there is provided a mobile station device which communicates with a base station device, the mobile station device including: a handover processing unit which acquires broadcast information of a base station device having global cell identification information designated by cell identification information in a handover command message, identifies the global cell identification information of at least two base station devices transmitting radio signals of the same synchronization channel, and then starts a handover procedure.

(12) In addition, according to an aspect of the present invention, there is provided a mobile communication method using a mobile station device and a base station device, the method including: transmitting, by the base station device, cell identification information of base station devices transmitting radio signals of the same synchronization channel, to the mobile station device when there are at least two base station devices transmitting radio signals of the same synchronization channel within a predetermined communication area, and executing, by the mobile station device, a measurement based on the cell identification information of the base station devices, and transmitting the measurement result acquired by the measurement to the base station devices.

(13) In addition, according to another aspect of the present invention, there is provided a mobile communication method using a mobile station device and a base station device, the method including: transmitting, by the base station device, a handover command message including cell identification information of base station devices transmitting radio signals of the same synchronization channel, to the mobile station device when there are at least two base station devices transmitting radio signals of the same synchronization channel within a predetermined communication area, and acquiring, by the mobile station device, broadcast information of a base station device having global cell identification information designated by the cell identification information of the handover command message, identifying the global cell identification information of at least two base station devices transmitting the radio signals of the same synchronization channel, and then starting a handover procedure.

Effect of the Invention

According to the present invention, the base station device notifies the mobile station device of the presence of the conflicting cell, such that the mobile station device can communicate with the base station device based on the presence of the conflicting cell. Accordingly, since exchange of unnecessary radio signals with a base station device of the conflicting cell does not occur, it is possible to simplify the process in the communication between the mobile station device and the base station device.

BRIEF DESCRIPTION OF THE DRAWINGS

FIG. 10A is a diagram showing an example of a measurement report message.

FIG. 10B is a diagram showing another example of the measurement report message.

FIG. 11A is a diagram showing an example of a handover command message.

FIG. 11B is a diagram showing another example of the hand over command message.

REFERENCE SYMBOLS

Figure 1:
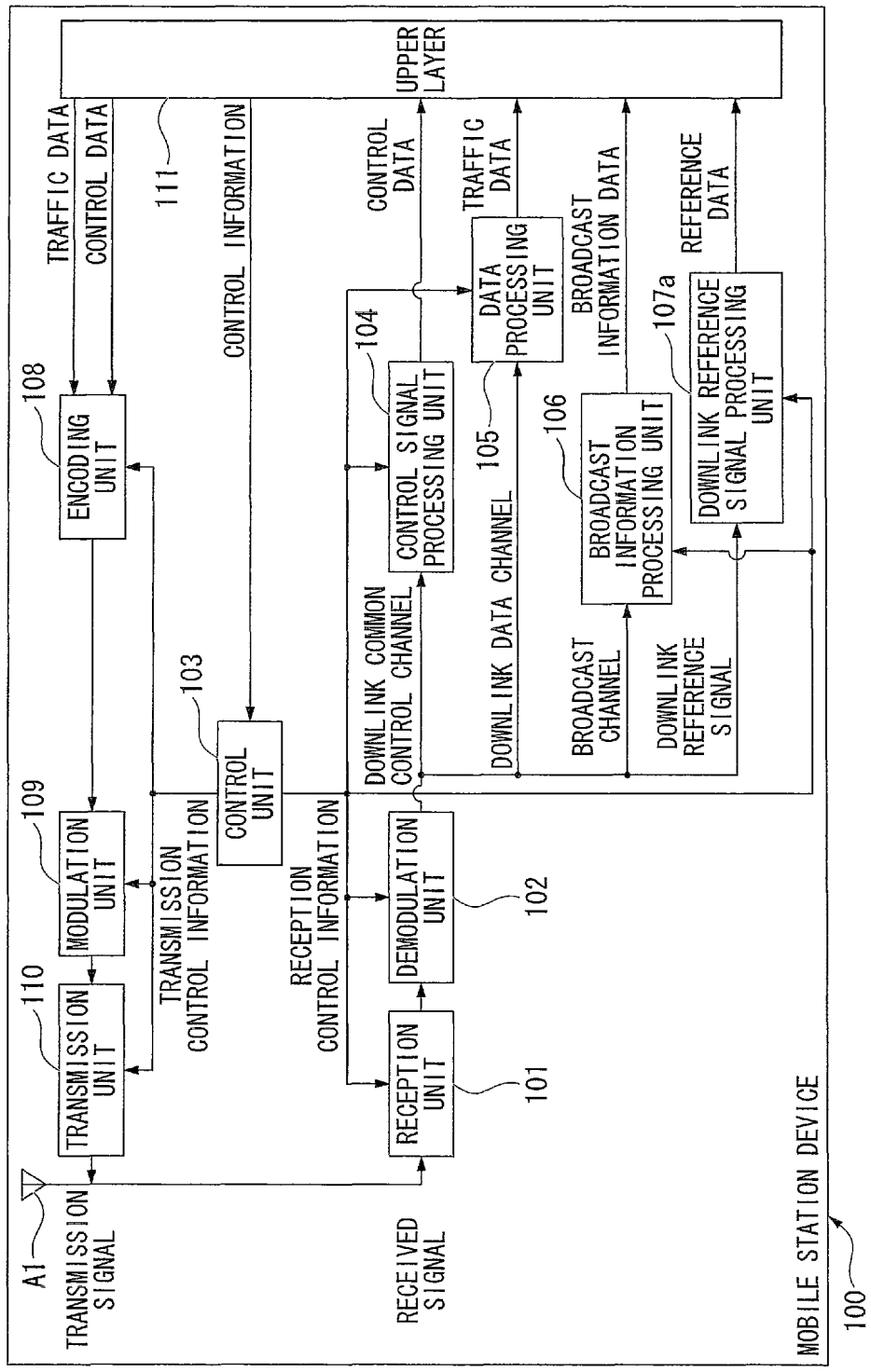
FIG. 1 is a schematic block diagram showing an example of a configuration of a mobile station device 100 according to a first embodiment of the present invention.

100: MOBILE STATION DEVICE
101: RECEPTION UNIT
102: DEMODULATION UNIT
103: CONTROL UNIT
104: CONTROL SIGNAL PROCESSING UNIT
105: DATA PROCESSING UNIT
106: BROADCAST INFORMATION PROCESSING UNIT
107a, 107b: DOWNLINK REFERENCE SIGNAL PROCESSING UNIT
108: ENCODING UNIT
109: MODULATION UNIT
110: TRANSMISSION UNIT
111: UPPER LAYER
200: BASE STATION DEVICE
201: RECEPTION UNIT
202: DEMODULATION UNIT
203: CONTROL UNIT
204: DATA PROCESSING UNIT

205: CONTROL SIGNAL PROCESSING UNIT
206: ENCODING UNIT
207: MODULATION UNIT
208: NEIGHBORING BASE STATION DEVICE INFORMATION MANAGEMENT UNIT
209: TRANSMISSION UNIT
210: UPPER LAYER
1071a, 1071b: DOWNLINK REFERENCE SIGNAL EXTRACTION UNIT
1072a, 1072b: SEQUENCE SELECTION UNIT
1073a, 1073b: CELL ID MANAGEMENT UNIT
1074a, 1074b: CORRELATION PROCESSING UNIT
1075a, 1075b: QUALITY MANAGEMENT UNIT
A1, A2: ANTENNA

BEST MODE FOR CARRYING OUT THE INVENTION

Hereinafter, respective embodiments of the present invention will be described with reference to the drawings.

Physical channels according to the respective embodiments of the present invention include a broadcast channel, an uplink data channel, a downlink data channel, a downlink common control channel, an uplink common control channel, a random access channel, a synchronization channel (SCH), and a reference signal.

In the respective embodiments of the present invention, the uplink data channel and the downlink data channel are classified as data channels. In addition, the broadcast channel, the downlink common control channel, the uplink common control channel, and the random access channel are classified as control channels.

Further, the synchronization channel (SCH) and the reference signal are classified as radio signals. There is a possibility for a physical channel to be further added in the future, but the description of the embodiments of the present invention is not influenced by the added physical channel. Furthermore, examples of the reference signal include a downlink reference signal and an uplink reference signal.

Since the physical channels according to the respective embodiments of the present invention are the broadcast channel and the downlink reference signal, the detailed description of the other physical channels is omitted.

The broadcast channel (BCH) is transmitted from the base station device to the mobile station device for the purpose of notifying the control parameter commonly used in the mobile station devices in the cell.

The broadcast channel (BCH) is classified into a P-BCH (primary BCH, primary broadcast channel) and a D-BCH (dynamic BCH, dynamic broadcast channel).

The primary broadcast channel (P-BCH) is determined in advance to be transmitted in a predetermined period in terms of time and frequency, and the mobile station device can receive the P-BCH for the cell having the identified cell ID. The primary broadcast channel (P-BCH) is transmitted from the base station device to the mobile station device using a central sub-carrier of a sub-frame #0.

Meanwhile, the dynamic broadcast channel (D-BCH) is transmitted from the base station device to the mobile station device using the downlink common control channel, and a transmission location may be changed for each cell.

The downlink reference signal is a pilot signal which is transmitted from the base station device to the mobile station device by quasi-static power for each cell. In addition, the downlink reference signal is repeated periodically at a predetermined time interval (for example, one frame). The mobile station device receives the downlink reference signal at a predetermined time interval, and uses the downlink reference signal to determine the reception quality for each cell.

The downlink reference signal is also used as a reference signal for demodulating downlink data transmitted together with the downlink reference signal. Any arbitrary sequence that can be uniquely identified for each cell can be used as the sequence used in the downlink reference signal.

First Embodiment

First, a first embodiment of the present invention will be described.

FIG. 1 is a schematic block diagram showing a configuration of a mobile station device 100 according to the first embodiment of the present invention. The mobile station device 100 includes a reception unit 101, a demodulation unit 102, a control unit 103 (also referred to as a handover processing unit), a control signal processing unit 104, a data processing unit 105, a broadcast information processing unit 106, a downlink reference signal processing unit 107a, an encoding unit 108, a modulation unit 109, a transmission unit 110 (also referred to as a measurement result transmission unit), an upper layer 111, and an antenna A1.

A received signal (a transmission signal from the base station device) is received by the reception unit 101 via the antenna A1. The received signal is output to the demodulation unit 102 and demodulated based on reception control information input from the control unit 103 to be classified into the downlink data channel, the downlink common control channel, the broadcast channel, and the downlink reference signal.

The reception control information includes reception timing for each channel, a multiplexing method, resource allocation information, or demodulation information. With regard to the respective classified channels, the downlink data channel is output to the data processing unit 105, the downlink common control channel is output to the signal processing unit 104, the broadcast channel is output to the broadcast information processing unit 106, and the downlink reference signal is output to the downlink reference signal processing unit 107a.

Channels other than the above-described channels are output to other channel control units (not shown), respectively, but since the present embodiment is not influenced by the other channels, a description thereof is omitted.

The data processing unit 105 extracts traffic data and outputs the traffic data to the upper layer 111. The control signal processing unit 104 extracts and outputs the control data to the upper layer 111. The broadcast information processing unit 106 extracts broadcast information data and outputs the broadcast information data to the upper layer 111.

The downlink reference signal processing unit 107a extracts reference data and outputs the reference data to the upper layer 111. In addition, control information is input from the upper layer 111 to the control unit 103.

Meanwhile, traffic data and control data are input from the upper layer 111 to the encoding unit 108 and encoded as transmission data. The control data includes data of an uplink common control channel and an uplink reference signal.

Transmission control information is input from the control unit 103 to the encoding unit 108, the modulation unit 109, and the transmission unit 110. The transmission control information includes transmission timing or a multiplexing method for an uplink channel, information on allocation of transmission data of each channel, and information on modulation or transmission power.

Each transmission data encoded by the encoding unit 108 based on the transmission control information is input to the modulation unit 109. The modulation unit 109 performs a modulation process on the transmission data in an appropriate modulation format according to the information instructed by the control unit 103.

The data modulated by the modulation unit 109 is input to the transmission unit 110, and is transmitted from the antenna A1 to the base station device based on the channel allocation after appropriate power control.

Since the other components of the mobile station device 100 are not involved with the present embodiment, they are not shown in the drawings. The operation of each block is generally controlled by the upper layer 111.

The transmission unit 110 performs a measurement process based on cell identification information of the base station device, and transmits a measurement report of reception quality acquired by the measurement process to the base station device.

The control unit 103 acquires broadcast information of the base station device having global cell identification information designated by cell identification information of a handover command message. The control unit 103 starts a handover procedure after identifying global cell identification information of at least two base station devices transmitting radio signals of the same synchronization channel.

Figure 2:
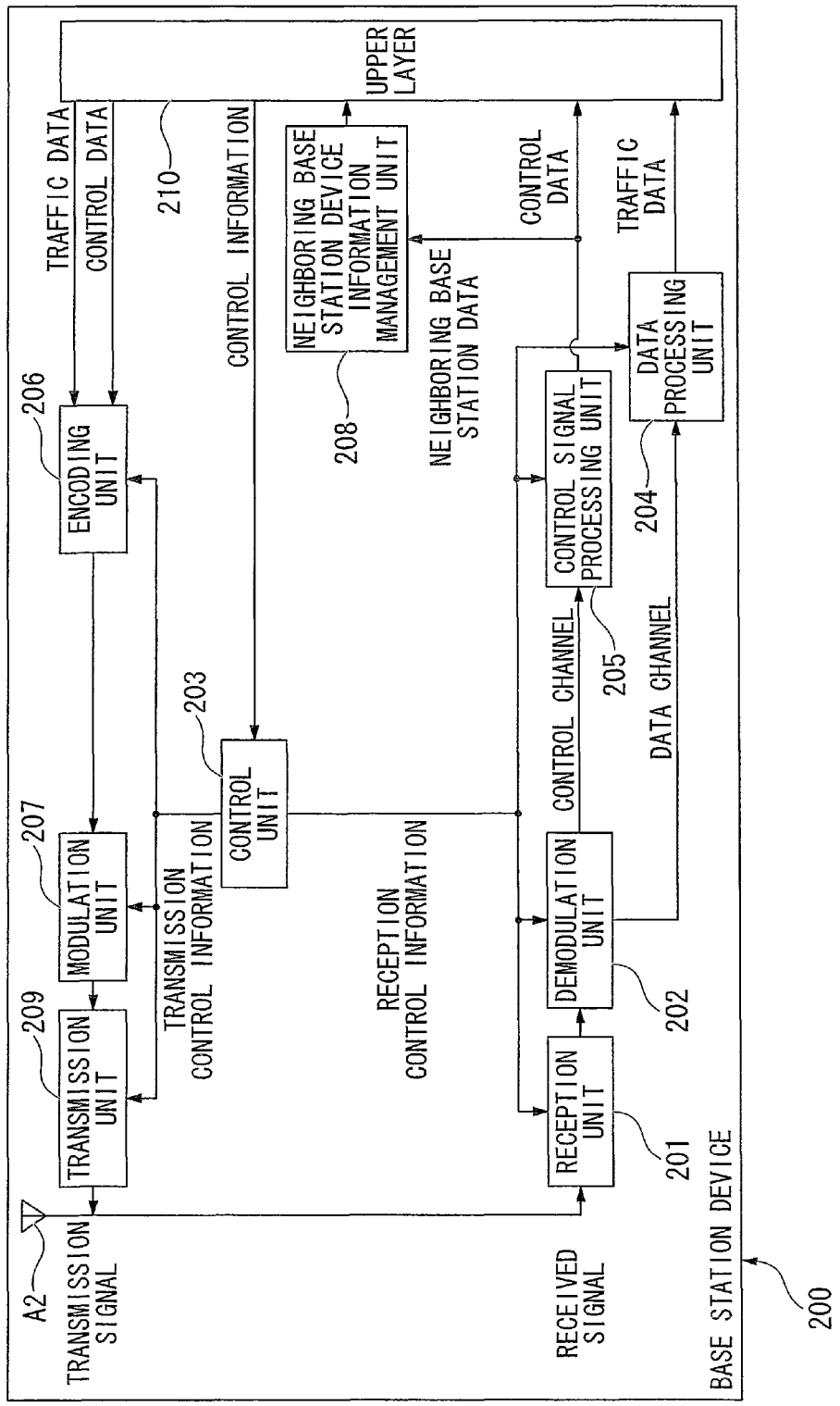
FIG. 2 is a schematic block diagram showing an example of a configuration of a base station device 200 according to the first embodiment of the present invention.

FIG. 2 is a block diagram showing an example of a configuration of a base station device 200 according to the first embodiment of the present invention. The base station device 200 includes a reception unit 201, a demodulation unit 202, a control unit 203, a data processing unit 204, a control signal processing unit 205, an encoding unit 206, a modulation unit 204, a neighboring base station device information management unit 208, a transmission unit 209 (also referred to as a cell identification information transmission unit), an upper layer 210, and an antenna A2.

A received signal (a transmission signal from the mobile station device 100 or another base station device 200) is received by the reception unit 201 via the antenna A2. Reception control information involved with the data reception control is output from the control unit 203.

The received signal is output to the demodulation unit 202 and demodulated into a data channel and a control channel based on the reception control information indicated by the control unit 203.

Channels other than the above-described channels are respectively output to other different channel control units (not shown), but since the present embodiment is not influenced by the other channels, a description thereof is omitted.

With regard to the respective demodulated data, the data channel is output to the data processing unit 204, and the control channel is output to the control signal processing unit 205. The data processing unit 204 extracts traffic data and outputs the traffic data to the upper layer 210.

The control signal processing unit 205 extracts control data and outputs the control data to the upper layer 210. When the control data acquired by the control signal processing unit 205 includes quality information of the base station device 200 measured by the mobile station device 100 or data (neighboring base station data) on the base station device 200 such as cell ID allocation information of a neighboring cell, the control data is output to the neighboring base station device information management unit 208.

When the neighboring base station device information management unit 208 detects conflict of a cell ID in a predetermined area based on the quality information or the neighboring base station data, data required for notifying the mobile station device 100 of the conflicting cell ID is output to the upper layer 210. In addition, the control information is input from the upper layer 210 to the control unit 203.

Meanwhile, the traffic data and the control data are input from the upper layer 210 to the encoding unit 206. The control data includes the synchronization channel, the broadcast channel, or the downlink common control channel. In addition, the transmission control information is output from the control unit 203 to the encoding unit 206, the modulation unit 207, and the transmission unit 209.

The traffic data and the control data encoded by the encoding unit 206 are input to the modulation unit 207. The modulation unit 207 performs a modulation process on each transmission data in an appropriate modulation scheme according to the transmission control information from the control unit 203.

The data modulated by the modulation unit 207 is input to the transmission unit 209 and transmitted from the antenna A2 based on the channel allocation after appropriate power control.

Since the other components of the base station device 200 are not involved with the present embodiment, they are not shown in the drawings. Further, the operation of each block is generally controlled by the upper layer 210.

Further, when at least two base station devices 200 transmitting radio signals of the same synchronization channel are within predetermined communication area, the transmission unit 209 transmits the cell identification information of the base station devices 200 transmitting radio signals of the same synchronization channel to the mobile station device 100.

Furthermore, when at least two base station devices 200 transmitting radio signals of the same synchronization channel are within a predetermined communication area, the transmission unit 209 transmits a handover command message including the cell identification information of the base station devices 200 transmitting radio signals of the same synchronization channel to the mobile station device 100.

Figure 3:
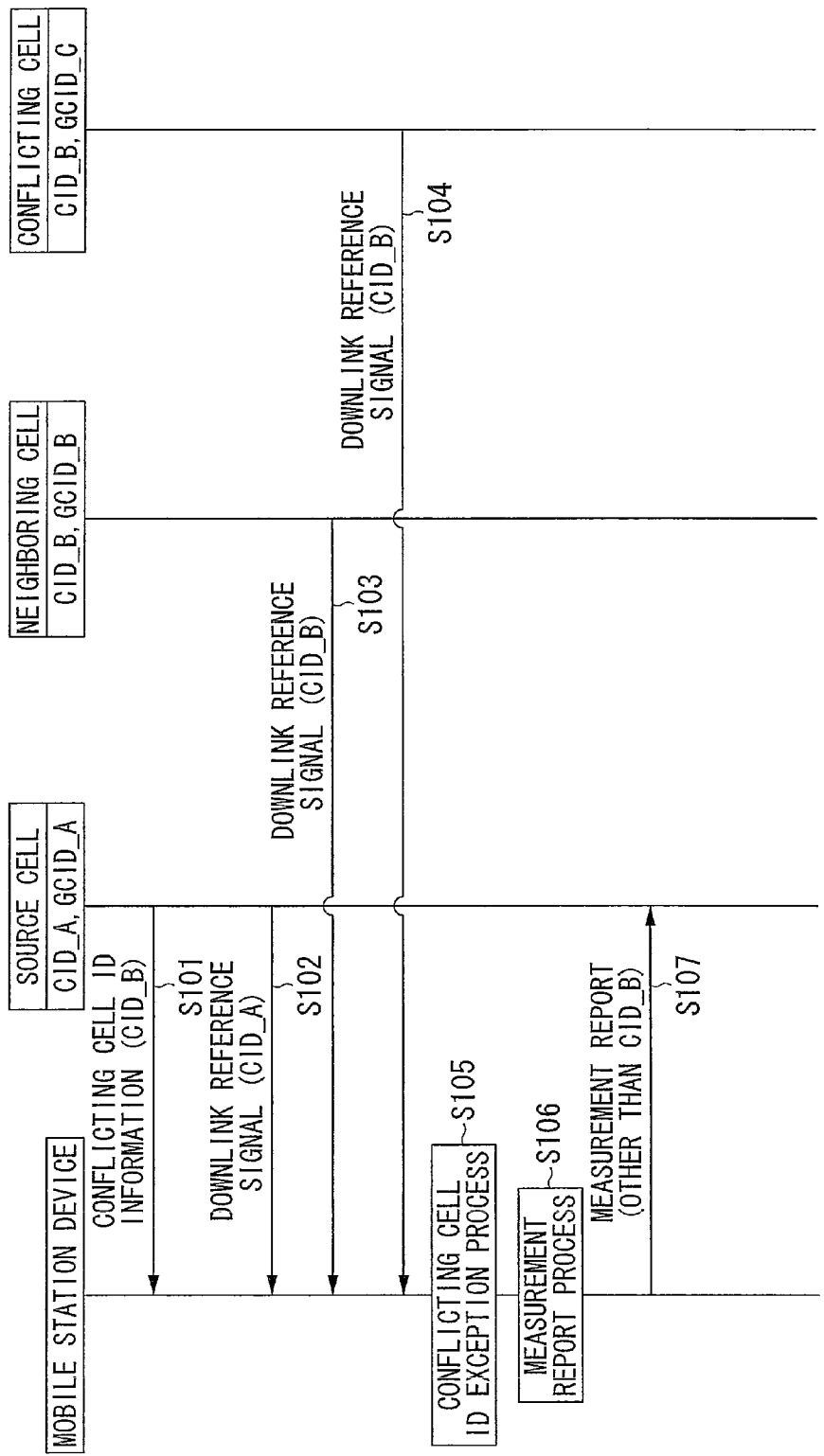
FIG. 3 is a flowchart showing a measurement report process in the mobile station device 100 according to the first embodiment of the present invention.

FIG. 3 is a sequence diagram showing a measurement report process in the mobile station device 100 according to the first embodiment of the present invention. FIG. 3 shows the measurement report process in the mobile station device 100 in the event of conflict of the cell IDs. It shows a state before the mobile station device 100 measures the reception quality of the serving cell and the neighboring cell, or during the measurement thereof.

Here, a case in which the mobile station device 100 is located in the zone of the source cell (cell ID=CID_A, GCID=GCID_A) will be described. In addition, a case in which the neighboring cell (cell ID=CID_B, GCID=GCID_B) and the conflicting cell (cell ID=CID_B, GCID=GCID_C) corresponding to the neighboring cells having the same cell ID are in the same measurable area will be described. Further, the source cell recognizes that the neighboring cell and the conflicting cell use the same cell ID (herein, CID_B).

At this time, the source cell notifies the mobile station device 100 before or during measurement of the conflicting cell ID information (step S101). The conflicting cell ID information includes at least a cell ID (CID_B).

In order for the source cell to notify the mobile station device 100 of the conflicting cell ID information, the source cell (CID_A) may use the broadcast channel (any one of P-BCH and D-BCH), or the downlink common control channel. In addition, when the source cell can notify the mobile station device 100 of the conflicting cell ID information, the other arbitrary physical channels or messages may be used.

The mobile station device 100 receives the downlink reference signal from the source cell having a cell ID of CID_A (step S102). In addition, the mobile station device 100 receives the downlink reference signal from the neighboring cell having a cell ID of CID_B (step S103). In addition, the mobile station device 100 receives the downlink reference signal from the conflicting cell having a cell ID of CID_B (step S104).

The mobile station device 100 acquiring the conflicting cell ID information performs a conflicting cell ID exception process (step S105). In the conflicting cell ID exception process, the mobile station device 100 restricts a process of receiving the downlink reference signal involved with the cell having the cell ID (CID_B of FIG. 3) indicated by the conflicting cell ID information and a reception quality measurement to perform a control so that it is not used to determine the reception quality of the cells. Alternatively, a report of an event (for example, establishment of a handover condition or the like) based on the reception quality of the cell having the cell ID indicated by the conflicting cell ID information is suppressed. According to the restriction, the reception quality of the cell having the CID_B, that is, the reception quality of the neighboring cell and the conflicting cell, and the event report are not included in the measurement report message by the measurement report process, and are transmitted to the source cell CID_A (step S107).

Figure 4:
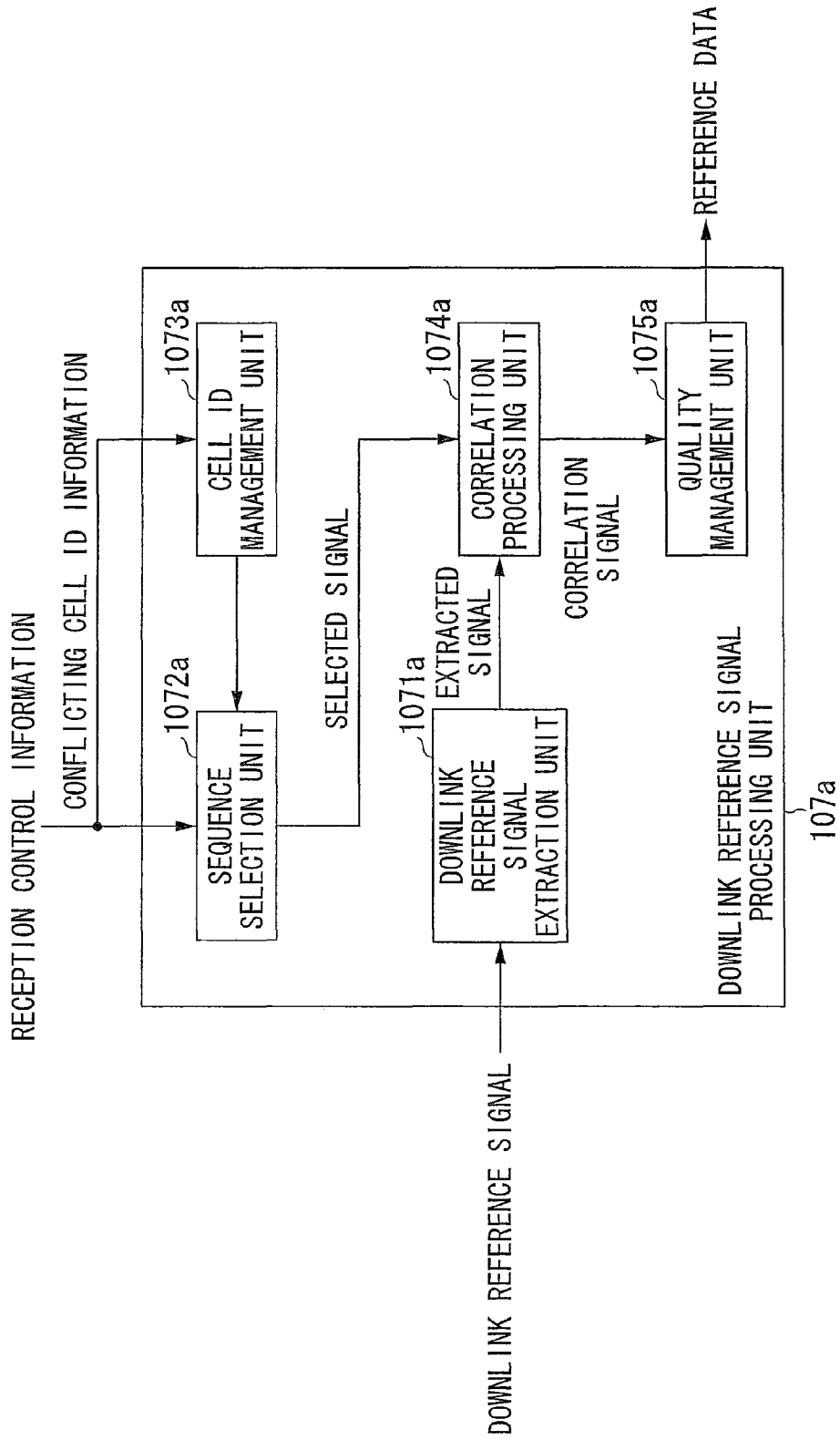
FIG. 4 is a schematic block diagram showing a configuration of a downlink reference signal processing unit 107a of the mobile station device 100 (FIG. 1) according to the first embodiment of the present invention.

FIG. 4 is a schematic block diagram showing a configuration of the downlink reference signal processing unit 107a of the mobile station device 100 (FIG. 1) according to the first embodiment of the present invention. The downlink reference signal processing unit 107a includes a downlink reference signal extraction unit 1071a, a sequence selection unit 1072a, a cell ID management unit 1073a, a correlation processing unit 1074a, and a quality management unit 1075a.

The reception control information from the control unit 103 is input to the sequence selection unit 1072a. The reception control information required for the sequence selection unit 1072a may include, for example, a frequency bandwidth, reception time information (frame information, sub-frame information, slot information, or the like), reception frequency information (a reception resource block number, a sub-carrier number, or the like), a cell ID, and the like.

The sequence selection unit 1072a selects (or creates) an appropriate downlink reference signal sequence used for demodulation based on the input reception control information, and inputs a resultant signal (the selected signal) to the correlation processing unit 1074a. Meanwhile, when conflicting cell ID information is received, the conflicting cell ID information (cell ID) among the reception control signal is input to the cell ID management unit 1073a.

The cell ID management unit 1073a instructs the sequence selection unit 1072a not to select (or create) the downlink reference signal sequence based on the conflicting cell ID.

The received downlink reference signal is input to the downlink reference signal extraction unit 1071a. The downlink reference signal extraction unit 1071a arranges the input downlink reference signals in an order of the signal sequence according to the reception control information and outputs a resultant signal as an extracted signal to the correlation processing unit 1074a.

The correlation processing unit 1074a correlates the selected signal with the extracted signal based on the cell ID other than the conflicting cell ID, and outputs a correlation signal to the quality management unit 1075a. The quality management unit 1075a measures the reception quality of the cell for each cell ID based on the correlation signal, and outputs the reception quality as the reference data to the upper layer 111.

Here, the reception quality is a SUTRA carrier RSSI (received signal strength indicator), RSRP (reference signal received power), RSRQ (reference signal reception quality), path loss, or the like.

The quality management unit 1075a measures a channel quality indicator (CQI) for each of the multiple sub-carriers or one or more resource blocks in the serving cell, and outputs the CQI as the reference data to the upper layer 111.

The downlink reference signal processing unit 107a may be operated using a method different from the processing method described in FIG. 4 as long as a downlink reference signal of a cell other than the cell ID transmitted through the conflicting cell ID information (a conflicting cell ID) can be extracted and reference data representing the reception quality from the extracted signal can be output.

For example, a method of restricting an output corresponding to the cell having the conflicting cell ID when outputting the correlation signal or the reference data may be adopted.

Figure 5:
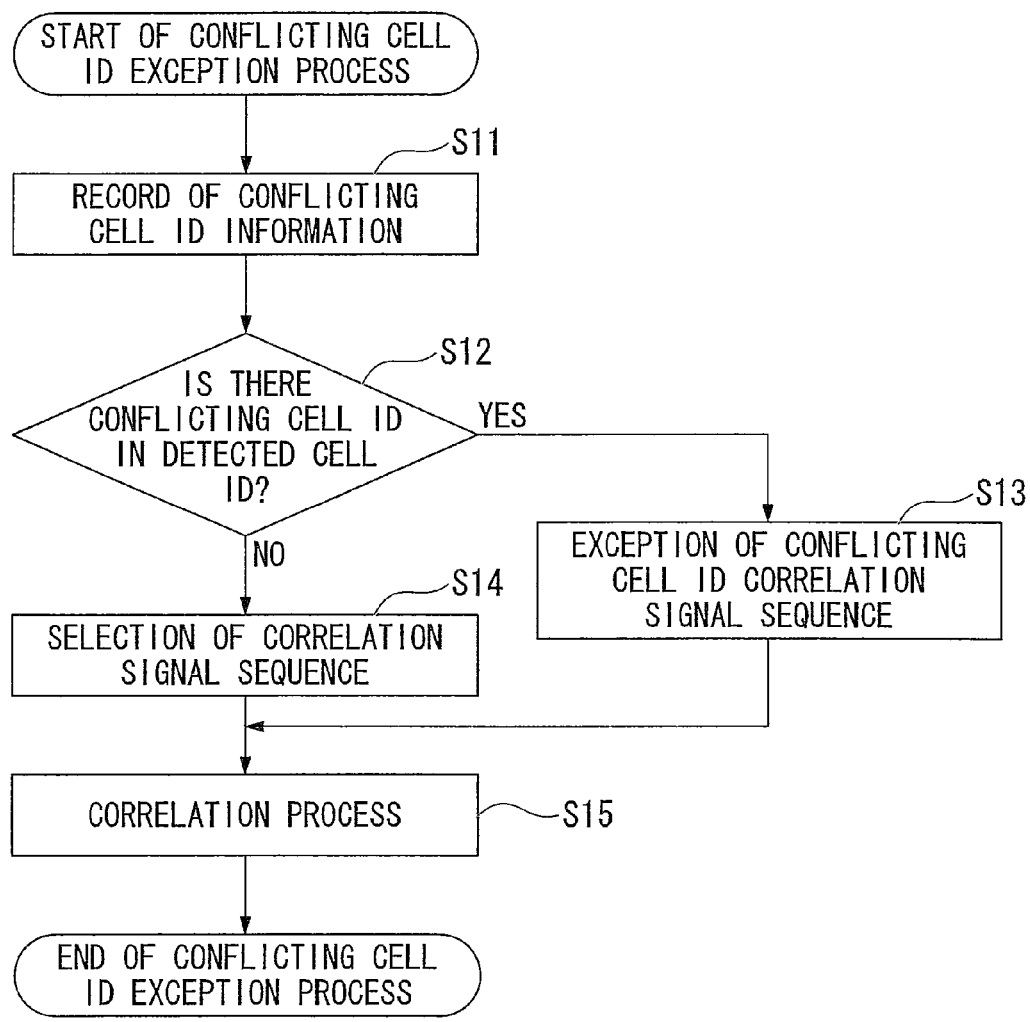
FIG. 5 is a flowchart showing a conflicting cell ID exception process (step S105 of FIG. 3) using the downlink reference signal processing unit 107a of the mobile station device 100 (FIG. 1) according to the first embodiment of the present invention.

FIG. 5 is a flowchart showing a conflicting cell ID exception process (step S105 of FIG. 3) in the downlink reference signal processing unit 107a of the mobile station device 100 (FIG. 1) according to the first embodiment of the present invention. The process of FIG. 5 starts when the mobile station device 100 receives the conflicting cell ID information.

First, the received conflicting cell ID information is recorded in the cell ID management unit 1073a (step S11).

Subsequently, it is determined whether the cell ID designated by the conflicting cell ID information (a conflicting cell ID) is included in the cell ID input to the sequence selection unit 1072a (a detected cell ID) (step S12).

When the conflicting cell ID is included ("YES" in step S12), the signal other than the downlink reference signal corresponding to the conflicting cell ID is selected by the sequence selection unit 1072a (step S13). When the conflicting cell ID is not included ("NO" in step S12), the downlink reference signal based on the reception control signal is selected by the sequence selection unit 1072a (step S14).

The correlation processing unit 1074a correlates the extracted signal of the received downlink reference signal with the selected signal of step S13 or S14 (step S15) and outputs a correlation signal.

According to the present embodiment, the measurement report of the reception quality of the cell of the conflicting cell ID from the mobile station device 100 to the base station device 200 is not performed. For this reason, the reception quality of the cell of the conflicting cell ID is not used as the handover reference, and the cell of the handover destination is not designated by the handover command message. The management of GCID is performed only by the base station device 200, and the management is not performed by the mobile station device 100.

According to the present embodiment, since the base station device 200 explicitly indicates that the same cell IDs exist and conflict with each other, the mobile station device 100 does not need to measure the downlink reference signal of the conflicting cell. Accordingly, it is possible to improve the possibility of success of the handover by removing uncertainty during the handover of not recognizing to which of the conflicting cells the mobile station device 100 is handed over.

In addition, the mobile station device does not need to measure the unnecessary reception quality of the conflicting cell. Further, since the measurement report message of the conflicting cell is not transmitted from the mobile station device 100 to the base station device 200, it is possible to reduce consumption power in the mobile station device.

Second Embodiment

Next, a second embodiment of the present invention will be described. A mobile communication system according to the second embodiment includes a base station device and a mobile station device. Since the configurations of the base station device and the mobile station device according to the second embodiment are the same as those of the base station device 200 (FIG. 2) and the mobile station device 100 (FIG. 1) according to the first embodiment, a description thereof is omitted.

However, the mobile station device 100 according to the second embodiment includes a downlink reference signal processing unit 107b instead of the downlink reference signal processing unit 107a.

The second embodiment provides a structure in which the mobile station device 100 acquiring the conflicting cell ID information can identify the reception quality of each of the conflicting cell IDs by receiving the GCID before the measurement report process.

The present embodiment is preferable when the transmission timings between the base station devices 200 are not synchronized, but may also be applied when the transmission timings between the base station devices 200 are synchronized.

Figure 6:
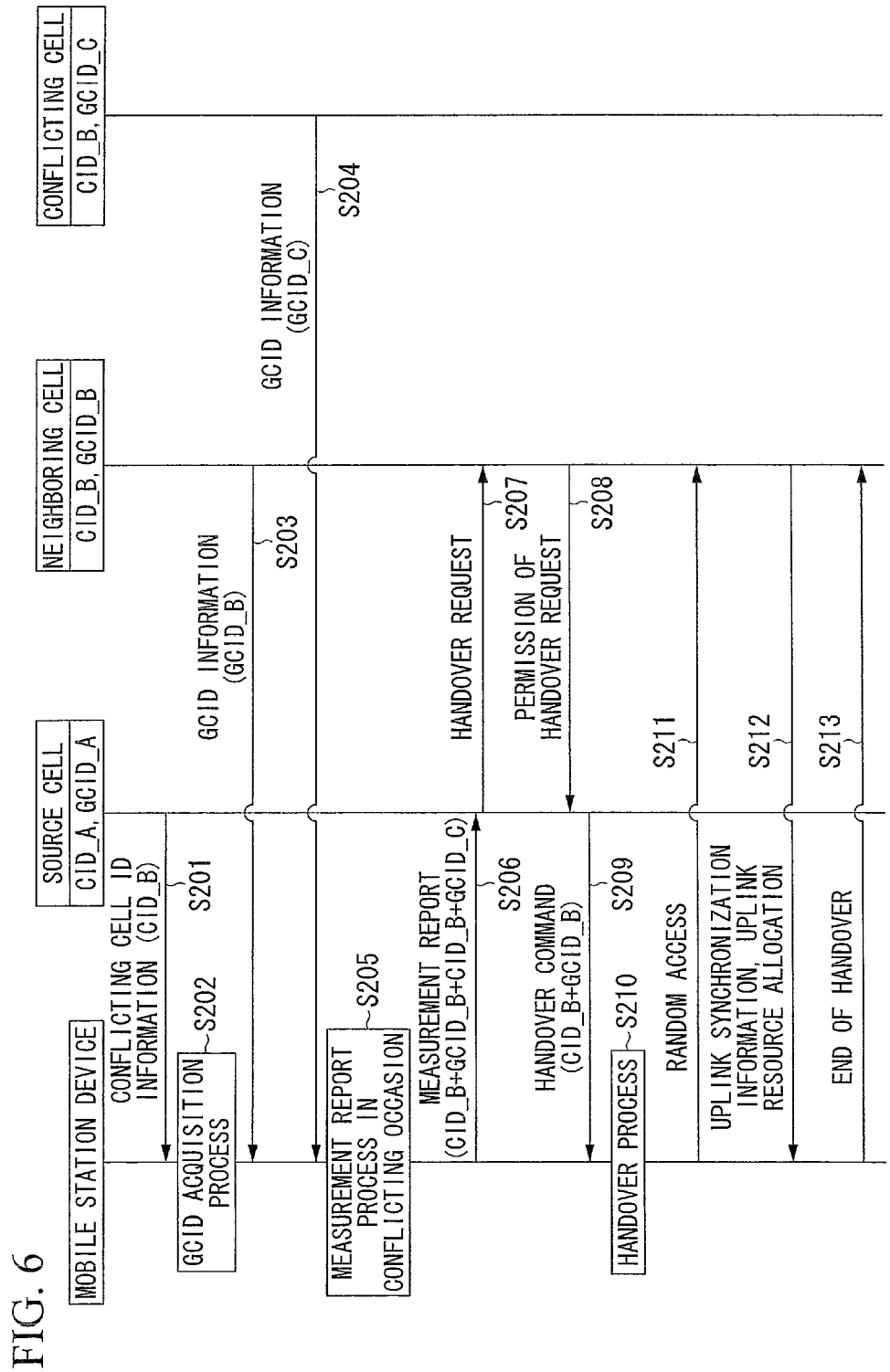
FIG. 6 is a sequence diagram showing a handover procedure according to a second embodiment of the present invention.

FIG. 6 is a sequence diagram showing a handover procedure according to the second embodiment of the present invention. FIG. 6 shows the handover procedure in the event of conflict of the cell IDs. The relationship of the mobile station device 100 and the serving cell and the neighboring cell is the same as that of FIG. 3. In addition, the transmission (steps S102, S103, and S104 of FIG. 3) of the downlink reference signal from the respective cells is not shown.

The source cell notifies the mobile station device 100 before or during the measurement of the conflicting cell ID information (step S201). The conflicting cell ID information includes at least a cell ID (CID_B). When notifying the mobile station device of the conflicting cell ID information, the source cell (CID_A) may use the broadcast channel (any one of P-BCH and D-BCH), or the downlink common control channel.

Other arbitrary physical channels or messages that enable the source cell to notify the mobile station device 100 of the conflicting cell ID information may be used.

The mobile station device 100 acquiring the conflicting cell ID information performs a GCID acquisition process (step S202). In the GCID acquisition process, a broadcast channel is received from the cell having the cell ID (CID_B of FIG. 6) transmitted in the conflicting cell ID information, and a GCID (GCID_B of FIG. 6) allocated to the cell having the designated cell ID is acquired.

The mobile station device 100 receives the GCID (steps S203 and S204) and performs a measurement involved with the acquired GCID and the cell ID in a measurement report process in conflicting occasion (step S205). Specifically, in the case where the cells are not synchronized, when the reception timings of the downlink reference signal and the broadcast channel are the same, it is determined that it is a channel transmitted from the same cell. For each cell, the reception quality of the downlink reference signal is correlated with the GCID acquired from the broadcast channel.

When the cells are synchronized, the mobile station device predicts the reception quality of the received downlink reference signal for each cell based on the reception quality (the received power, the block error rate (BLER), and the like) of the broadcast channel. Then, the mobile station device correlates the predicted reception quality of the downlink reference signal with the GCID acquired from the broadcast channel.

For example, in the example of FIG. 6, when a reception power ratio of the broadcast channel of the GCID_C and the broadcast channel of the GCID_B is 1 to 2, the reception quality of the downlink reference signal received through the CID_B is divided according to the GCID_B:GCID_C=1:2 and reported as respective reception qualities. Alternatively, the downlink reference signal of the cell having the conflicting cell ID information is not synthesized with the received signal and respective qualities of the signals are measured and reported as the reception qualities.

By the measurement report process in conflicting occasion, the source cell is transmitted the measurement result through the measurement report message (CID_A) (step S206). In this case, the reception quality that correlates the cell ID with the acquired GCID is set in the measurement report message. However, the reception quality of a cell other than the cell ID transmitted as the conflicting cell ID information may correspond to only the cell ID in the normal case.

The source cell (CID_A) can determine whether the reception quality measured by the mobile station device 100 belongs to the neighboring cell (CID_B) or the conflicting cell (CID_B) based on the contents of the measurement report message. When the source cell determines that the handover to the neighboring cell (CID_B) is necessary, the source cell (CID_A) notifies the neighboring cell (CID_B) of the necessity of the handover of the mobile station device 100 in the handover request message to request the preparation for the handover (step S207).

When it is determined that the handover can be performed, the neighboring cell (CID_B) receiving the handover request message notifies the source cell (CID_A) of the handover request permission message (step S208).

The source cell (CID_A) receiving the handover request permission message notifies the mobile station device 100 of the handover command message (step S209). At this time, when the cell of the conflicting cell ID is designated by the handover command message, the handover command message including both the cell ID and the GCID is transmitted.

The handover process starts when the mobile station device 100 receives the message. When the handover execution time is included in the handover command message, the mobile station device 100 performs the handover when the handover execution time lapses (step S210).

In some cases, immediate execution may be designated as the handover execution time. The mobile station device 100 changes the control parameter of the transmission/reception circuit or the radio frequency designated by the handover command message at the handover execution time. Subsequently, the mobile station device 100 performs a downlink synchronization setup process for setting up the downlink wireless synchronization with the designated neighboring cell CID_B (handover process).

Figure 18:
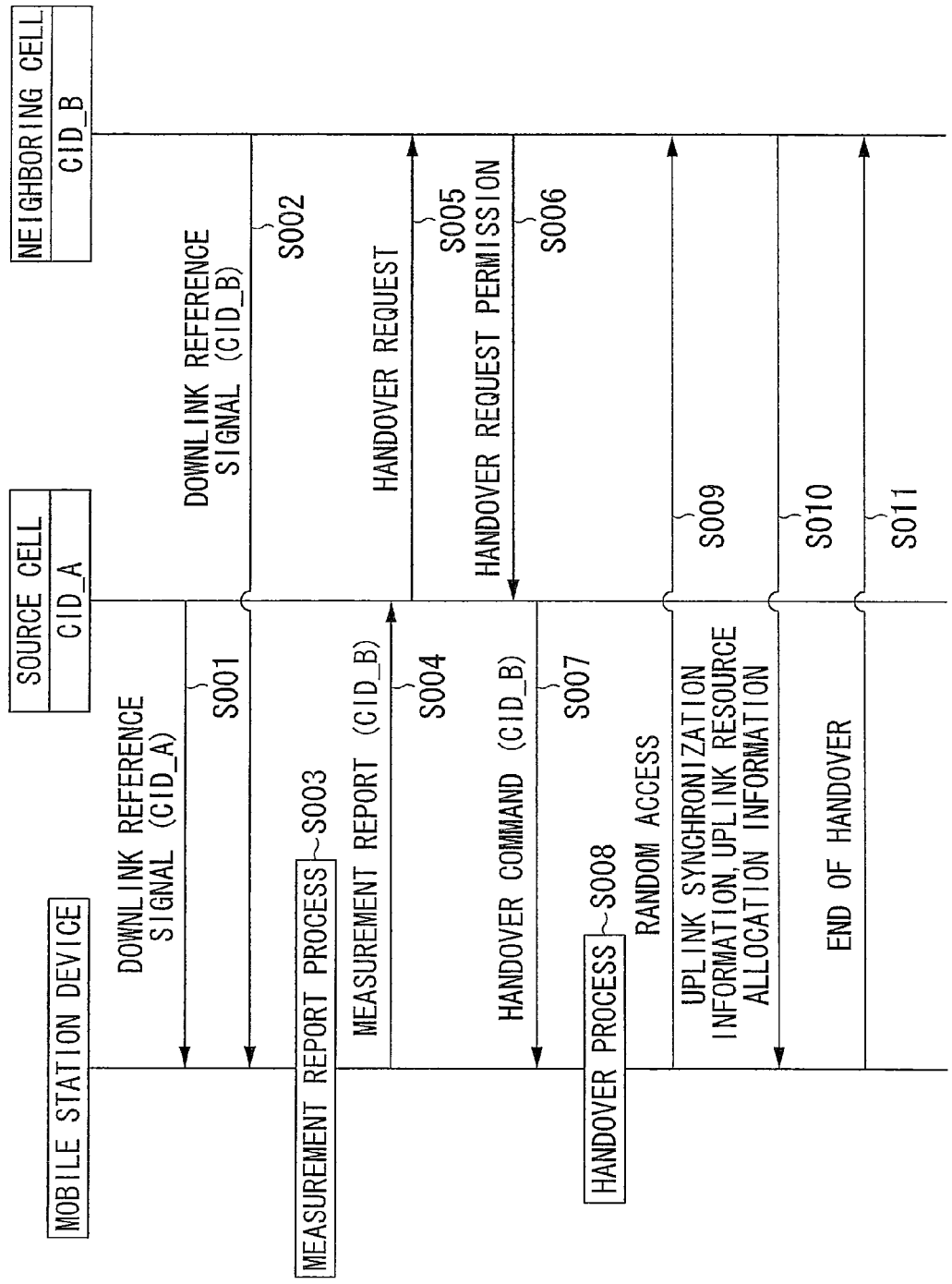
FIG. 18 is a sequence diagram showing a handover procedure used in EUTRA.

The control parameter for the downlink synchronization setup process is included in the prior handover command message, or the mobile station device is informed or transmitted thereof in advance by the source cell (CID_A). After completing the downlink synchronization setup, the mobile station device 100 performs a random access transmission so as to set up uplink synchronization with the neighboring cell (CID_B) (step S211). Since the process of steps S212 and S213 is the same as the process of steps S212 and S213 of FIG. 18, a description thereof is omitted.

Figure 7:
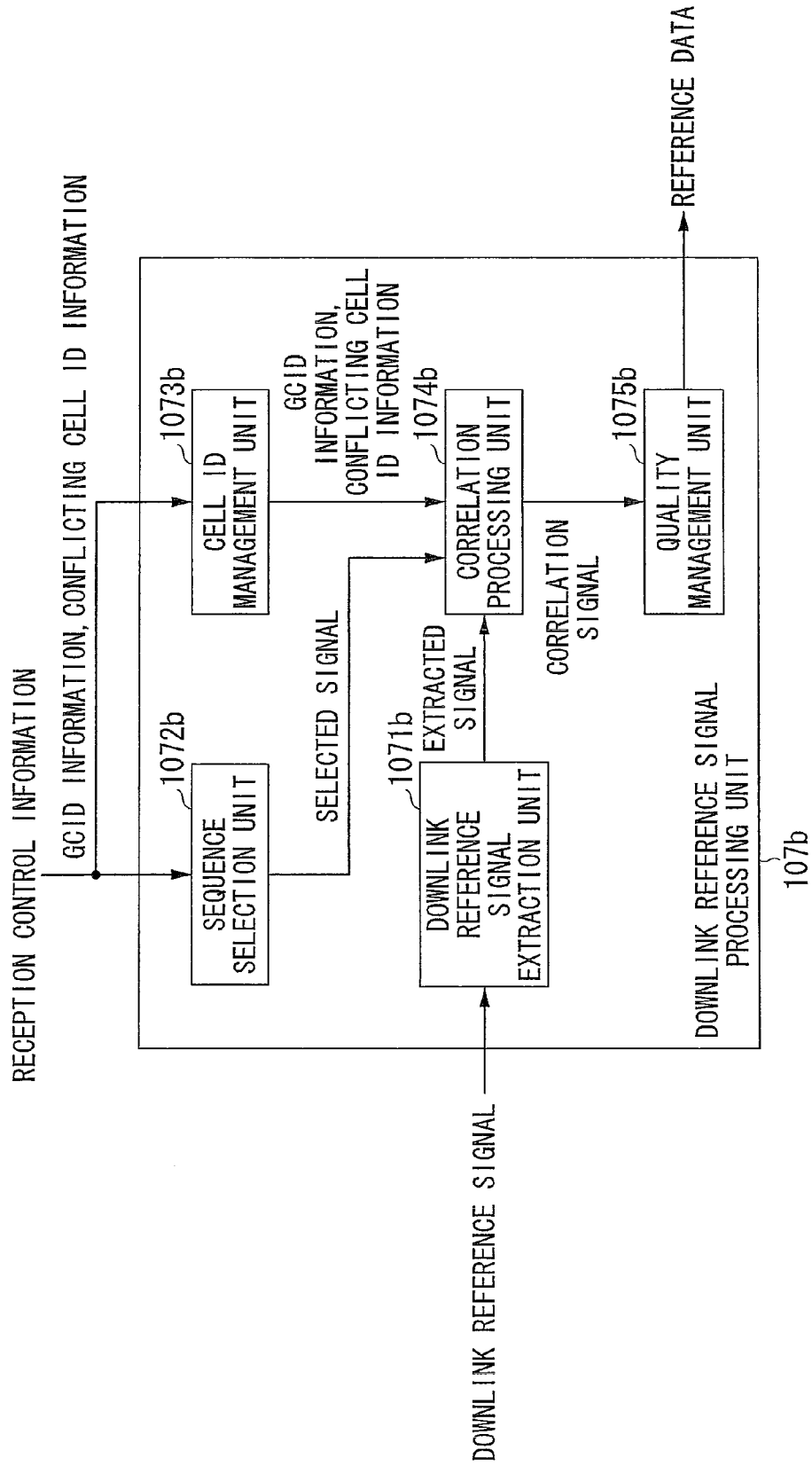
FIG. 7 is a schematic block diagram showing a configuration of a downlink reference signal processing unit 107b of the mobile station device 100 according to the second embodiment of the present invention.

FIG. 7 is a schematic block diagram showing a configuration of the downlink reference signal processing unit 107b of the mobile station device 100 according to the second embodiment of the present invention. The downlink reference signal processing unit 107b includes a downlink reference signal extraction unit 1071b, a sequence selection unit 1072b, a cell ID management unit 1073b, a correlation processing unit 1074b, and a quality management unit 1075b.

The reception control information is input from the control unit 103 to the sequence selection unit 1072b. The reception control information required for the sequence selection unit 1072b may include, for example, a frequency bandwidth, reception time information (frame information, sub-frame information, slot information, or the like), reception frequency information (a reception resource block number, a sub-carrier number, or the like), a cell ID, and the like.

The sequence selection unit 1072b selects (or creates) an appropriate downlink reference signal sequence used for demodulation based on the input reception control information, and inputs a resultant signal (selected signal) to the correlation processing unit 1074b.

Meanwhile, when the conflicting cell ID information is received, the conflicting cell ID information (cell ID) and the GCID information among the reception control signal are input to the cell ID management unit 1073b. The conflicting cell ID information and the GCID information uniquely correspond to each cell.

The received downlink reference signal is input to the downlink reference signal extraction unit 1071b. The downlink reference signal extraction unit 1071b arranges the input downlink reference signals in an order of the signal sequence according to the reception control information, and outputs a resultant signal as the extracted signal to the correlation processing unit 1074b. In addition, the cell ID management unit 1073b notifies the correlation processing unit 1074b of the GCID information and the conflicting cell ID information.

In the case where the extracted signal is correlated with the selected signal based on the cell ID of the conflicting cell is performed, when outputting the correlation signal to the quality management unit 1075b, the correlation processing unit 1074b makes a correlation with the GCID information other than the cell ID, and outputs the correlation signal for each GCID to the quality management unit 1075b.

In cases other than the cell ID of the conflicting cell, generally, the correlation signal for each cell ID is output to the quality management unit 1075b. The quality management unit 1075b measures the reception quality of the cell for each GCID or each cell ID based on the correlation signal, and outputs the reception quality as the reference data to the upper layer 111.

Here, the reception quality is a EUTRA Carrier RSSI, RSRP, RSRQ, path loss, or the like.

The quality management unit 1075b measures a quality information indicator for each of multiple sub-carriers or one or more resource blocks in the serving cell, and outputs the quality information indicator as the reference data to the upper layer 111.

The downlink reference signal processing unit 107b may be operated using a method different from that described in FIG. 7 as long as reference data indicating the reception quality of the cell for each GCID can be output upon correlation with a downlink reference signal corresponding to the cell ID transmitted through the conflicting cell ID information.

Figure 8:
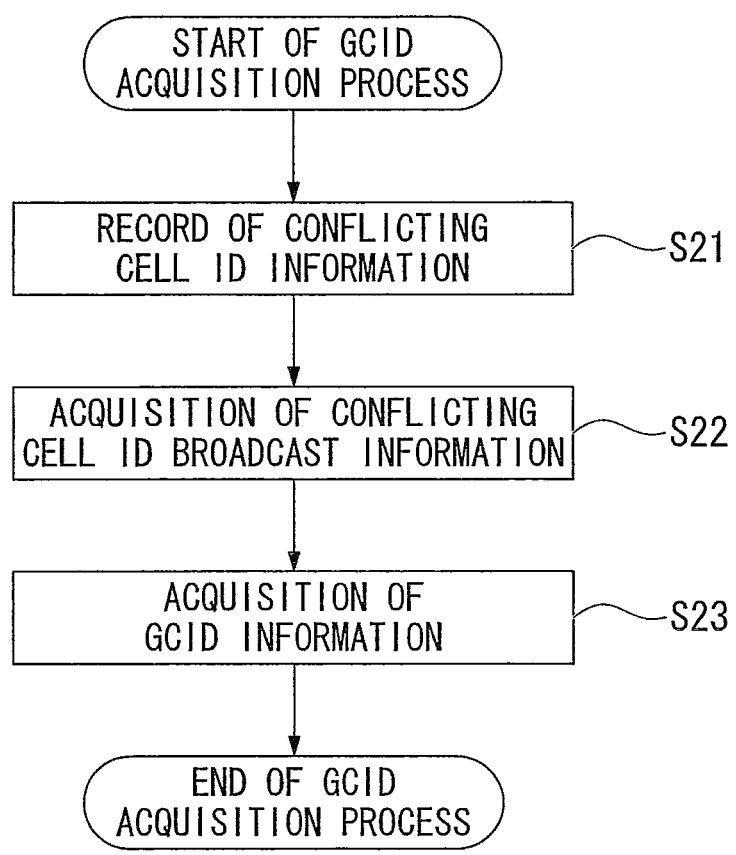
FIG. 8 is a flowchart showing a GCID acquisition process using the mobile station device 100 according to the second embodiment of the present invention.

FIG. 8 is a flowchart showing a GCID acquisition process using the mobile station device 100 according to the second embodiment of the present invention. The process of FIG. 8 starts when the mobile station device 100 receives the conflicting cell ID information.

First, the mobile station device 100 records the received conflicting cell ID information (step S21). Subsequently, the broadcast channel transmitted from the cell having the cell ID recorded in step S21 is received, and the broadcast information for each cell is acquired (step S22).

Finally, the GCID information is acquired from the received broadcast information and is recorded (step S23). The process of FIG. 8 ends.

Figure 9:
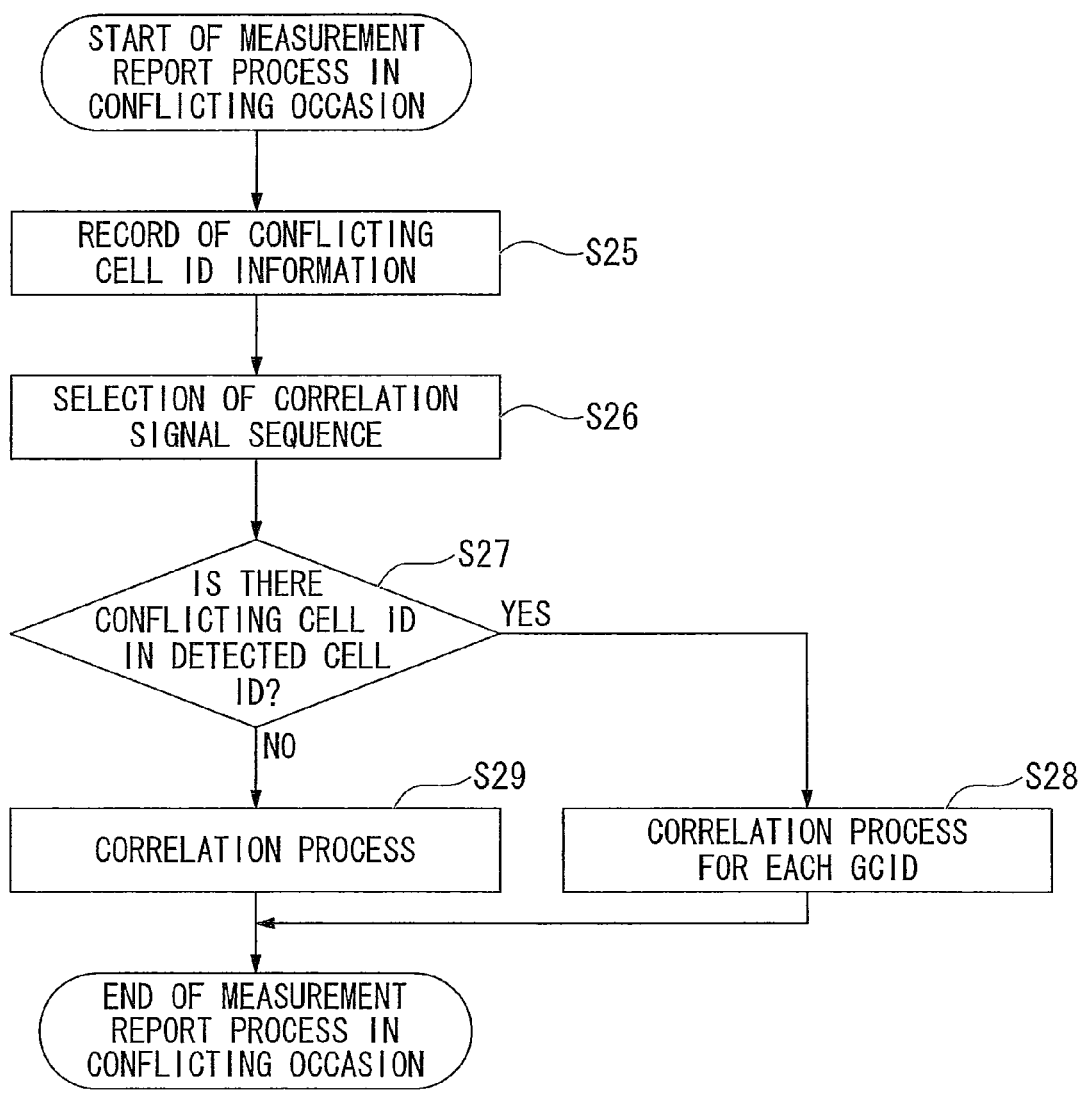
FIG. 9 is a flowchart showing a measurement report process in conflicting occasion (step S205 of FIG. 6) in the downlink reference signal processing unit 107b of the mobile station device 100 according to the second embodiment of the present invention.

FIG. 9 is a flowchart showing a measurement report process in conflicting occasion (step S205 of FIG. 6) in the downlink reference signal processing unit 107b of the mobile station device 100 according to the second embodiment of the present invention. The process of FIG. 9 starts when the mobile station device 100 receives the conflicting cell ID information.

First, the received conflicting cell ID information is recorded in the cell ID management unit 1073b (step S25).

Subsequently, the downlink reference signal based on the reception control signal is selected by the sequence selection unit 1072b (step S26). Next, it is determined whether the cell ID designated by the conflicting cell ID information (a conflicting cell ID) is included in the cell ID selected by the sequence selection unit 1072b (a detected cell ID) (step S27).

When the conflicting cell ID is included ("YES" in step S27), the correlation processing unit 1074b correlates the extracted signal of the downlink reference signal of the received conflicting cell with the selected signal of step S26. Herein, the correlation process is performed so that the correlation signal is output for each GCID of the conflicted cell ID (step S28).

When the conflicting cell ID is not included ("NO" in step S27), the correlation processing unit 1074b correlates the extracted signal of the received downlink reference signal with the selected signal of step S26 (step S29) and outputs the correlation signal.

FIGS. 10A and 10B are diagrams showing an example of a measurement report message. FIG. 10A is an example of a conventional message in which the cell ID designated by the conflicting cell ID information is not included in the measurement report message. FIG. 10B is an example of the message in which the cell ID designated by the conflicting cell ID information is included in the measurement report message.

In FIG. 10A, the mobile station device 100 reports the cell ID (for example, CID_A) and the quality information (for example, quality information_A) as one set. As the reported set, for example, a method of reporting a cell having a quality exceeding a threshold may be used, but other methods may also be used.

In FIG. 10B, when reporting the reception quality of the cell having the conflicting cell ID, the mobile station device 100 reports the cell ID (for example, CID_B), the GCID (for example, GCID_B), and the reception quality (quality information_B) as one set. The cell ID not in the conflict state has the same configuration as that of FIG. 10A. In addition, as the contents of the quality information, one or more types of measurement results may be included.

FIGS. 11A and 11B are diagrams showing an example of a handover command message. FIG. 11A is an example of a conventional message when the handover to a cell ID other than the cell ID designated by the conflicting cell ID information is instructed. FIG. 11B is an example of the message when the handover to the cell ID designated by the conflicting cell ID information is instructed.

In FIG. 11A, the base station device 200 transmits at least the cell ID and the control parameter used for the handover. As shown in FIG. 11A, the control parameter includes frequency information, CID information (for example, CID_B), preamble information, handover execution time, and uplink transmission timing. In addition, control parameters other than the control parameter may be used if the other control parameters are required for the handover procedure.

In FIG. 11B, the base station device 200 transmits a control parameter having at least GCID information (for example, GCID_B) added thereto in addition to the information of FIG. 11A.

According to the present embodiment, the measurement report of the reception quality corresponding to the GCID of the conflicting cell ID is performed from the mobile station device 100 to the base station device 200. For this reason, the mobile station device 100 can report the reception quality for each cell even when the cell has the conflicting cell ID.

In addition, the base station device 200 can appropriately select the cell of the handover destination. Further, it is possible to explicitly indicate the cell designated as the cell of the handover destination. Furthermore, since it is desirable that the mobile station device 100 acquires only the GCID of the designated cell when receiving the conflicting cell ID information, the measurement procedure in an area without the conflicting cell may be the same as the normal case.

According to the present embodiment, since the base station device 200 explicitly indicates presence of the same cell IDs, conflict of the cell IDs, and the GCIDs of the conflicting cells, the mobile station device 100 can measure the downlink reference signal based on the GCID.

In addition, since it is possible to explicitly indicate the quality information of each cell by means of the GCID even when the cell is conflicting, it is possible to report the highly precise measurement result to the base station device 200. Accordingly, since it is possible to suppress the inappropriate handover, it is possible to improve the communication quality.

Further, it is possible to improve the possibility of success of the handover by removing uncertainty during the handover of not recognizing to which of the conflicting cells the mobile station device 100 is handed over.

Third Embodiment

Next, a third embodiment of the present invention will be described. A mobile communication system according to the third embodiment includes a base station device and a mobile station device. Since the configurations of the base station device and the mobile station device according to the third embodiment are the same as those of the base station device 200 (FIG. 2) and the mobile station device 100 (FIG. 1) according to the first embodiment, a description thereof is omitted.

The third embodiment provides a structure capable of identifying a cell accessed after handover by including conflicting cell ID information in a handover command message.

Figure 12:
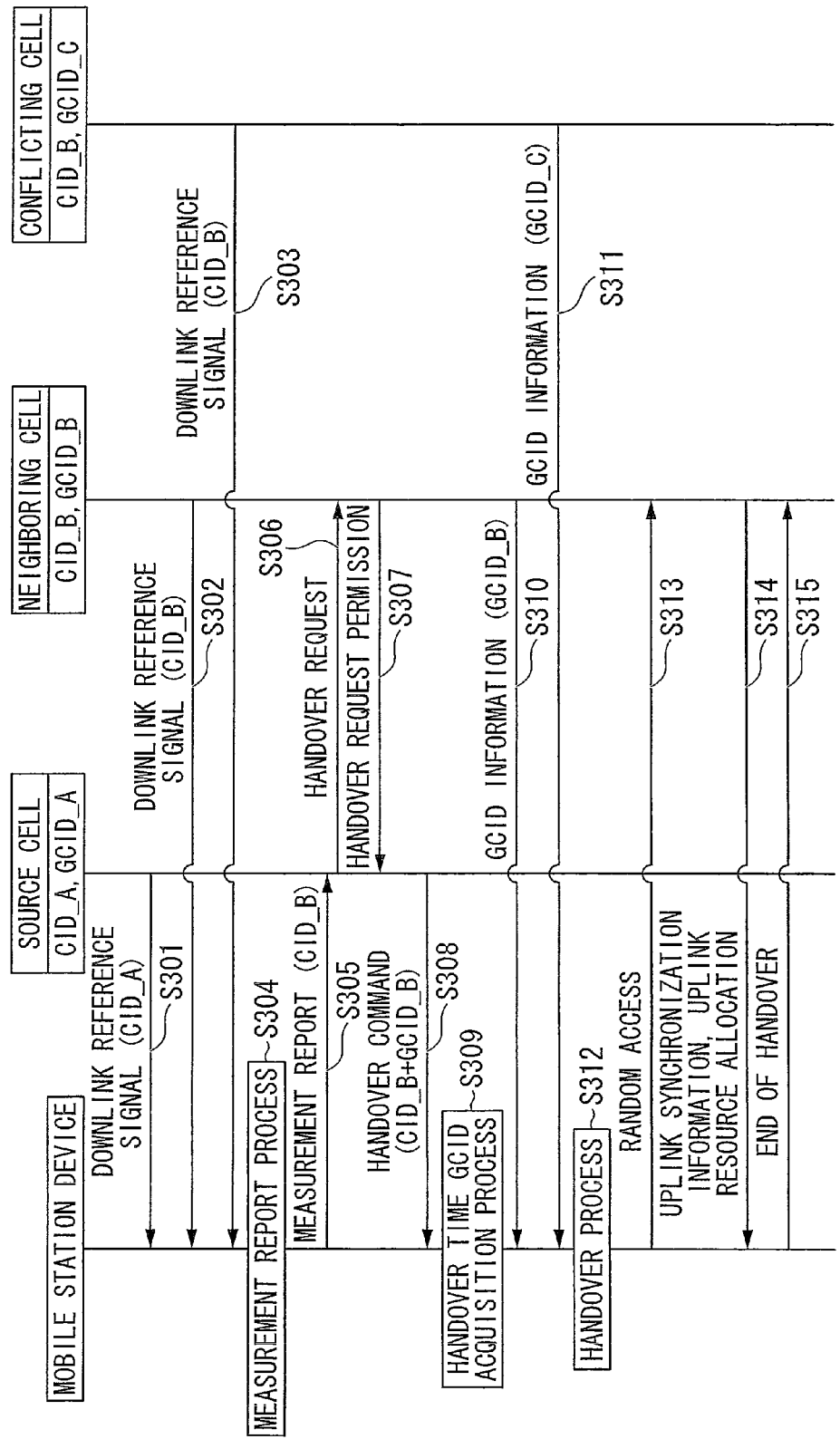
FIG. 12 is a sequence diagram showing a handover procedure according to a third embodiment of the present invention.

FIG. 12 is a sequence diagram showing a handover procedure according to the third embodiment of the present invention. FIG. 12 shows the handover procedure in the event of conflict of the cell ID.

The relationship of the mobile station device 100, serving cells and neighboring cells is the same as that of FIG. 3. In addition, the process up to notification of the handover command message from the source cell (CID_A) (steps S305, S306, and S307) is the same as the process (steps S206, S207, and S208) of FIG. 6.

Figure 19:
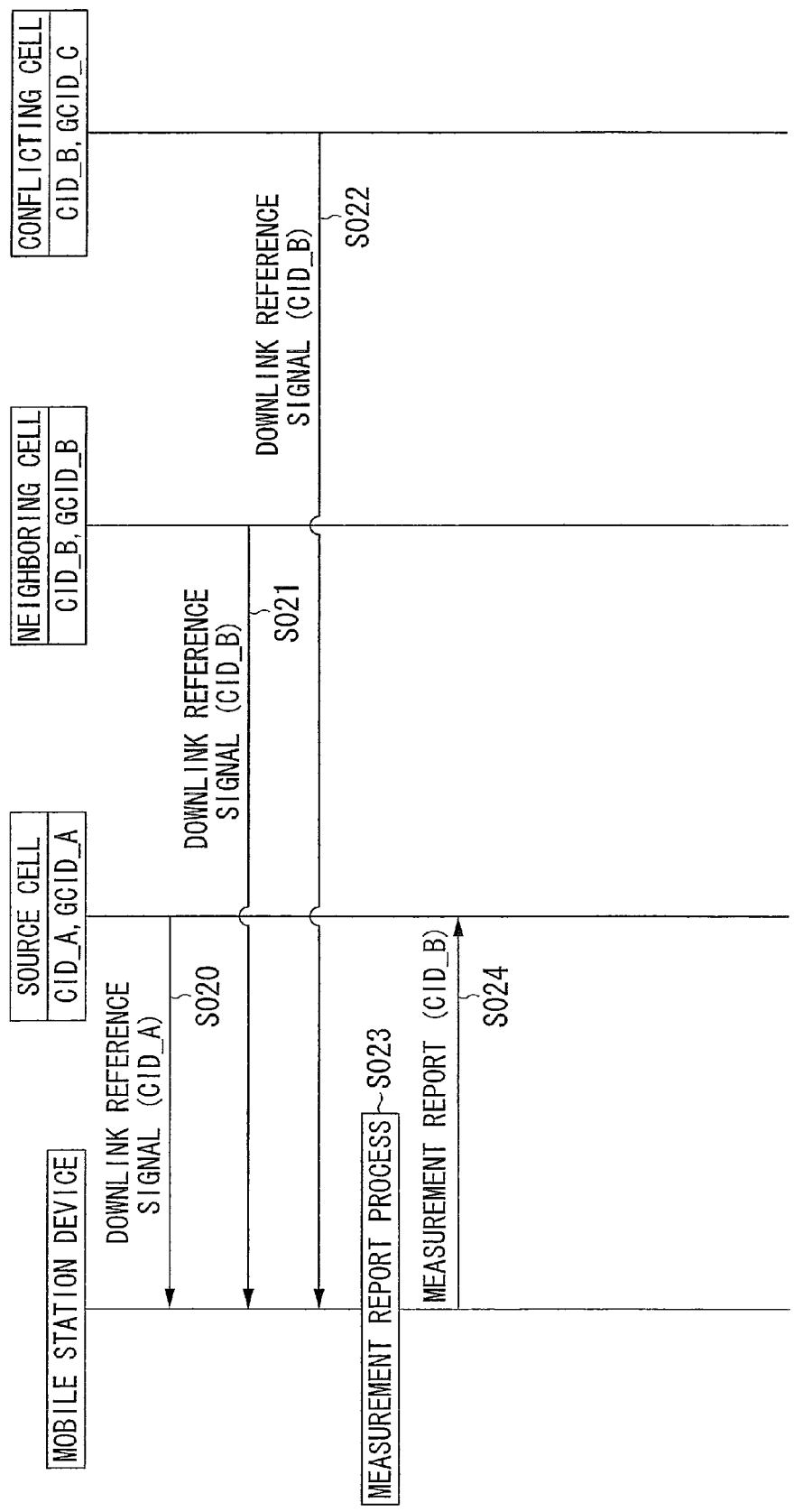
FIG. 19 is a sequence diagram showing a handover procedure when the same cell ID is measured by a mobile station device.

In addition, the process of measuring a downlink reference signal in a measurement report process (steps S301, S302, S303, and S304) is the same as the process (steps S020, S021, S022, and S023) of FIG. 19.

The base station device 200 of the source cell (CID_A) of the present embodiment stores information such as the reception quality of a neighboring cell reported from the mobile station device 100 and the number of handover successes for each cell in the neighboring base station device information management unit 208. In addition, the base station device 200 of the source cell (CID_A) can designate an appropriate cell of a handover destination using such statistical information even when the mobile station device 100 has performed a measurement without identifying the downlink reference signal of the same cell ID.

In the present embodiment, the source cell includes conflicting cell ID information in the handover command message when transmitting the handover command message to the mobile station device 100 (step S308). The conflicting cell ID information includes at least a cell ID (for example, CID_B) and a GCID (for example, GCID_B).

The mobile station device 100 acquiring the conflicting cell ID information performs a handover time GCID acquisition process (step S309). In the handover time GCID acquisition process, a broadcast channel is received from the cell having the cell ID (CID_B of FIG. 12) transmitted by the conflicting cell ID information in the handover command message, and the GCID allocated to the designated cell ID is acquired.

The mobile station device 100 receives the GCID from the broadcast channel of the designated cell ID before the handover process (steps S310 and S311), and uniquely specifies the cell of the handover destination (the neighboring cell CID_B as the GCID_B in FIG. 12).

When a handover execution time is included in the handover command message, the mobile station device 100 performs a GCID acquisition process before the handover execution time lapses, and performs the handover when the handover execution time lapses (step S312). When immediate execution is designated as the handover execution time or when the handover execution time lapses before GCID acquisition, the mobile station device 100 performs the handover immediately after acquiring the GCID.

The mobile station device 100 changes a control parameter of the transmission/reception circuit or a radio frequency designated by the handover command message when the GCID has been acquired and the handover execution time has lapsed. Subsequently, the mobile station device 100 performs a downlink synchronization setup process for setting up the downlink wireless synchronization with the neighboring cell (CID_B) having the matched GCID (handover process).

The control parameter for the downlink synchronization setup process is included in the prior handover command message, or the mobile station device 100 is informed or transmitted thereof in advance by the source cell (CID_A). After the downlink synchronization setup is completed, the mobile station device 100 performs a random access transmission so as to set up uplink synchronization with the neighboring cell (CID_B) (step S313). Since the process of steps S314 and S315 is the same as the process of steps S212 and S213 of FIG. 6, a description thereof is omitted.

Figure 13:
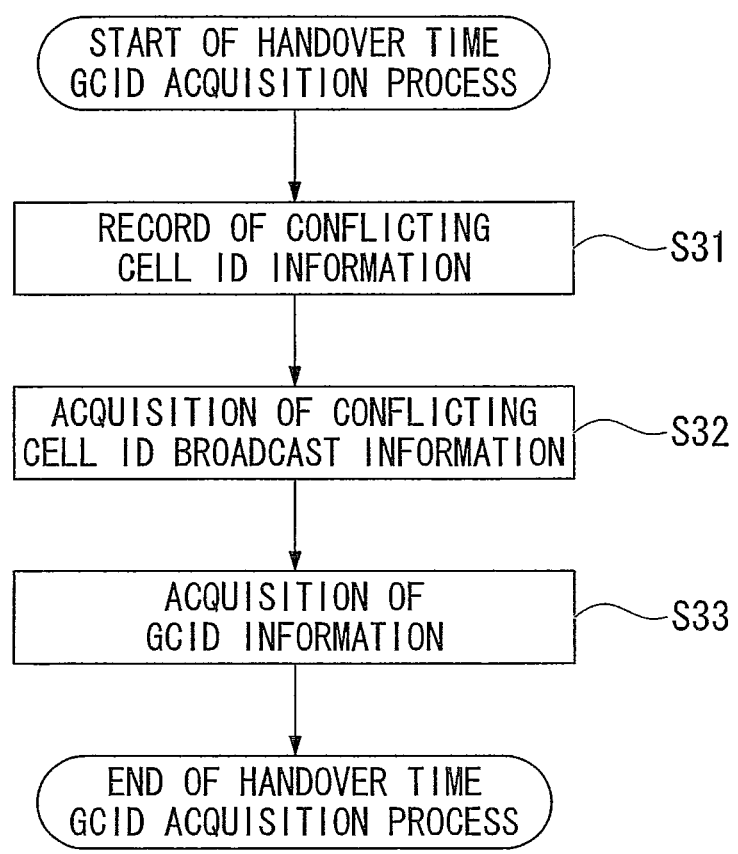
FIG. 13 is a flowchart showing a GCID acquisition process (step S309 of FIG. 12) of the mobile station device 100 according to the third embodiment of the present invention.

FIG. 13 is a flowchart showing a GCID acquisition process (step S309 of FIG. 12) in the mobile station device 100 according to the third embodiment of the present invention. The process of FIG. 13 starts when the mobile station device 100 receives the handover command message including the conflicting cell ID information.

First, the mobile station device 100 records the received conflicting cell ID information (step S31). Subsequently, the mobile station device 100 receives the broadcast channel transmitted from the cell having the cell ID recorded in step S31, and acquires the broadcast information for each cell (step S32). Finally, the mobile station device 100 acquires the GCID information from the received broadcast information and records the GCID information (step S33). The process shown in FIG. 13 is then terminated.

The configuration of the handover command message used in the present embodiment is the same as that of FIG. 11A or 11B. That is, when the base station device 200 instructs the mobile station device 100 to be handed over to the cell ID other than the cell ID designated by the conflicting cell ID information, the base station device 200 transmits the message of FIG. 11A. When the base station device 200 instructs the mobile station device 100 to be handed over to the cell ID designated by the conflicting cell ID information, the base station device 200 transmits the message of FIG. 11B to the mobile station device 100.

According to the present embodiment, since the mobile station device 100 does not need to execute a particular process on the measurement report, it is possible to simplify the control. In addition, the base station device 200 can explicitly indicate the cell designated as the cell of the handover destination using the GCID. For this reason, the mobile station device 100 can specify the cell of the handover destination even when cell IDs conflict with each other.

In addition, since the mobile station device 100 may receive only the GCID of the designated cell when receiving the conflicting cell ID information by the handover command message, the handover procedure in an area without the conflicting cells may be the same as that of the normal case.

According to the present embodiment, since the base station device 200 explicitly indicates presence of the same cell IDs, the conflict of the same cell IDs, and the GCID of the conflicting cell, the mobile station device 100 can specify the cell of the handover destination based on the GCID when the handover procedure is started.

In addition, it is possible to improve the possibility of success of the handover by removing uncertainty during the handover of not recognizing to which of the conflicting cells the mobile station device 100 is handed over.

Fourth Embodiment

Next, a fourth embodiment of the present invention will be described. The mobile communication system according to the fourth embodiment includes the base station device and the mobile station device. Since the configurations of the base station device and the mobile station device according to the fourth embodiment are the same as those of the base station device 200 (FIG. 2) and the mobile station device 100 (FIG. 1) according to the first embodiment, a description thereof is omitted.

The fourth embodiment provides a structure capable of identifying the reception quality of the cell having each conflicting cell ID by including the cell ID and the GCID in the conflicting cell ID information and receiving and the GCID before the measurement report process. In addition, the present embodiment provides a structure in which the reception quality of the cell having the designated GCID is not reported by the mobile station device 100.

The present embodiment is preferable when the transmission timings between the base station devices 200 are not synchronized. However, the present embodiment may be applied even when the transmission timings between the base station devices 200 are synchronized.

Figure 14:
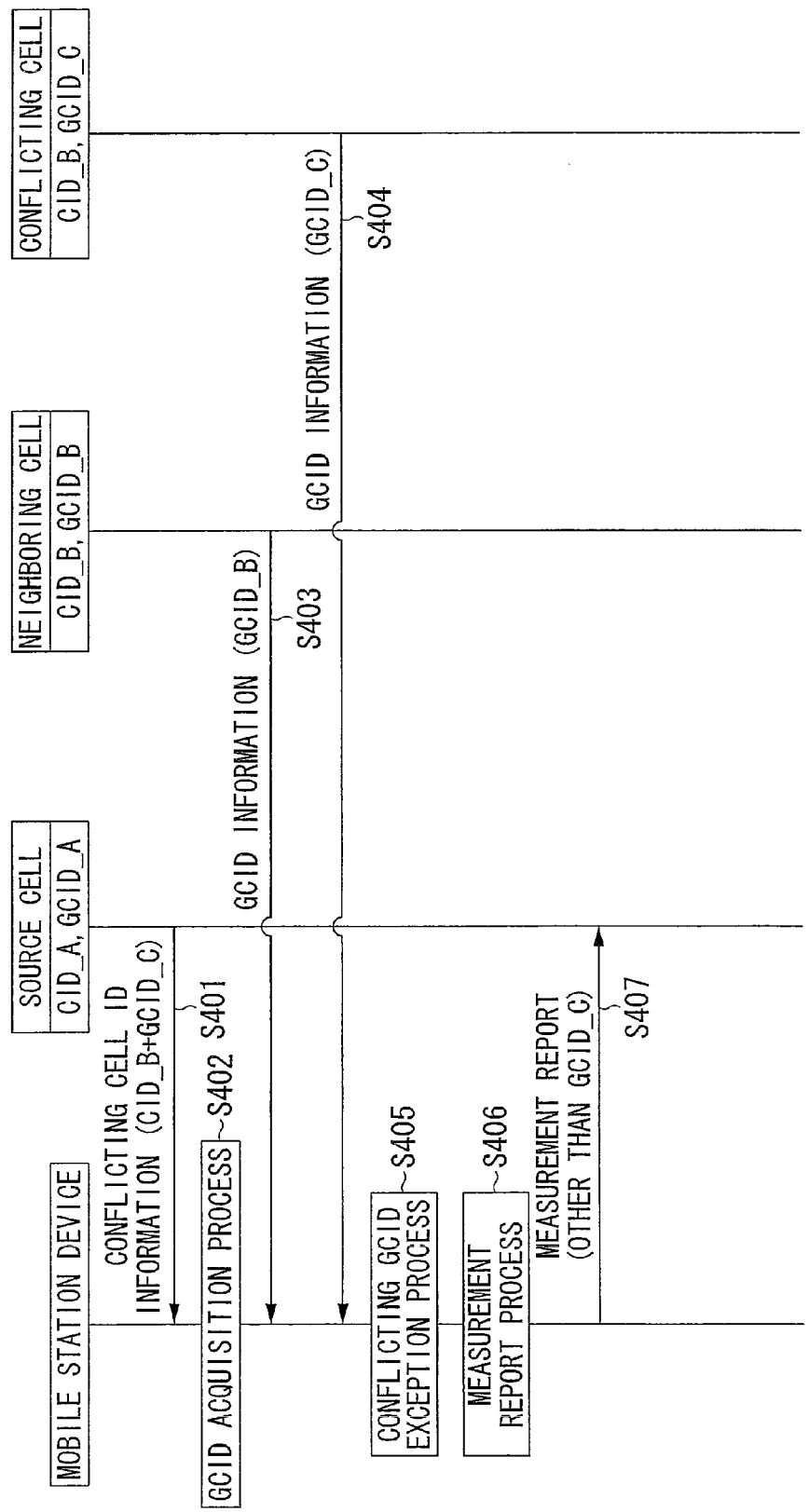
FIG. 14 is a sequence diagram showing a handover procedure according to a fourth embodiment of the present invention.

FIG. 14 is a sequence diagram showing a measurement report process in the mobile station device 100 according to the fourth embodiment of the present invention. FIG. 14 shows the measurement report process in the mobile station device 100 in the event of conflict of the cell ID. The relationship of the mobile station device 100, the serving cell and neighboring cells is the same as that of FIG. 3.

The source cell notifies the mobile station device 100 before or during measurement of the conflicting cell ID information (step S401). The conflicting cell ID information includes at least the cell ID (for example, CID_B) and the GCID (for example, GCID_C).

When notifying the mobile station device 100 of the conflicting cell ID information, the source cell (CID_A) may use the broadcast channel (any one of P-BCH and D-BCH), or the downlink common control channel.

Other arbitrary physical channels or messages that enable the source cell to notify mobile station device 100 of the conflicting cell ID information may be used.

The mobile station device 100 acquiring the conflicting cell ID information performs a GCID acquisition process (step S402). In the GCID acquisition process, the broadcast channel is received from the cell having the cell ID (CID_B of FIG. 14) transmitted by the conflicting cell ID information, and the GCID allocated to the cell having the designated cell ID is acquired.

The mobile station device 100 receives the GCID (steps S403 and S404), and performs a conflicting GCID exception process (step S405). In the conflicting GCID exception process, the process of receiving the downlink reference signal for the cell having the GCID (GCID_C of FIG. 14) indicated by the conflicting cell ID information, and the reception quality measurement are restricted to perform a control so that it is not used to determine the reception quality of the cells, or a report of an event (for example, establishment of a handover condition or the like) based on the reception quality of the cell of the GCID indicated by the conflicting cell ID information is suppressed.

Specifically, in the case where the cells are not synchronized, when the reception timings of the downlink reference signal and the broadcast channel are the same, the mobile station device 100 determines that it is a channel transmitted from the same cell. Then, the mobile station device 100 correlates the reception quality of the downlink reference signal with the GCID acquired from the broadcast channel for each cell. Then, the mobile station device 100 restricts the report of the downlink reference signal to the cell having the GCID as the conflicting cell.

When the cells are synchronized, the mobile station device 100 predicts the reception quality of the received downlink reference signal for each cell based on the reception quality (the received power, the BLER, and the like) of the broadcast channel. Then, the mobile station device 100 correlates the predicted reception quality of the downlink reference signal with the GCID acquired from the broadcast channel. Alternatively, the mobile station device 100 measures qualities of the downlink reference signal of the cell having the conflicting cell ID information and the received signal, with the signals not being synthesized, and correlates the qualities with the GCID acquired from the broadcast channel.

The report of the downlink reference signal to the cell having the GCID as the conflicting cell is restricted. In the conflicting cell ID exception process, the mobile station device 100 restricts the process of receiving the downlink reference signal for the cell having the GCID (GCID_C of FIG. 14) indicated by the conflicting cell ID information, and the reception quality measurement to perform a control so that it is not used to determine the reception quality of the cells. Accordingly, the reception quality of the cell having the GCID_C is not included in the measurement report message in the measurement report process (step S406), and is transmitted to the source cell (CID_A) (step S407).

Since the downlink reference signal processing unit of the mobile station device 100 according to the present embodiment can be the same as the downlink reference signal processing unit 107b of FIG. 7, a detailed description thereof is omitted. However, a process capable of outputting a reference data other than the downlink reference signal involved with the cell having the designated GCID is performed in the downlink reference signal processing unit 107b of the present embodiment.

For example, when the selected signal, the correlation signal, or the reference data is output, the output corresponding to the cell having the GCID designated by the conflicting cell ID information (the conflicting cell ID) is restricted. In addition, the GCID acquisition process may be the same as the process of FIG. 8.

Figure 15:
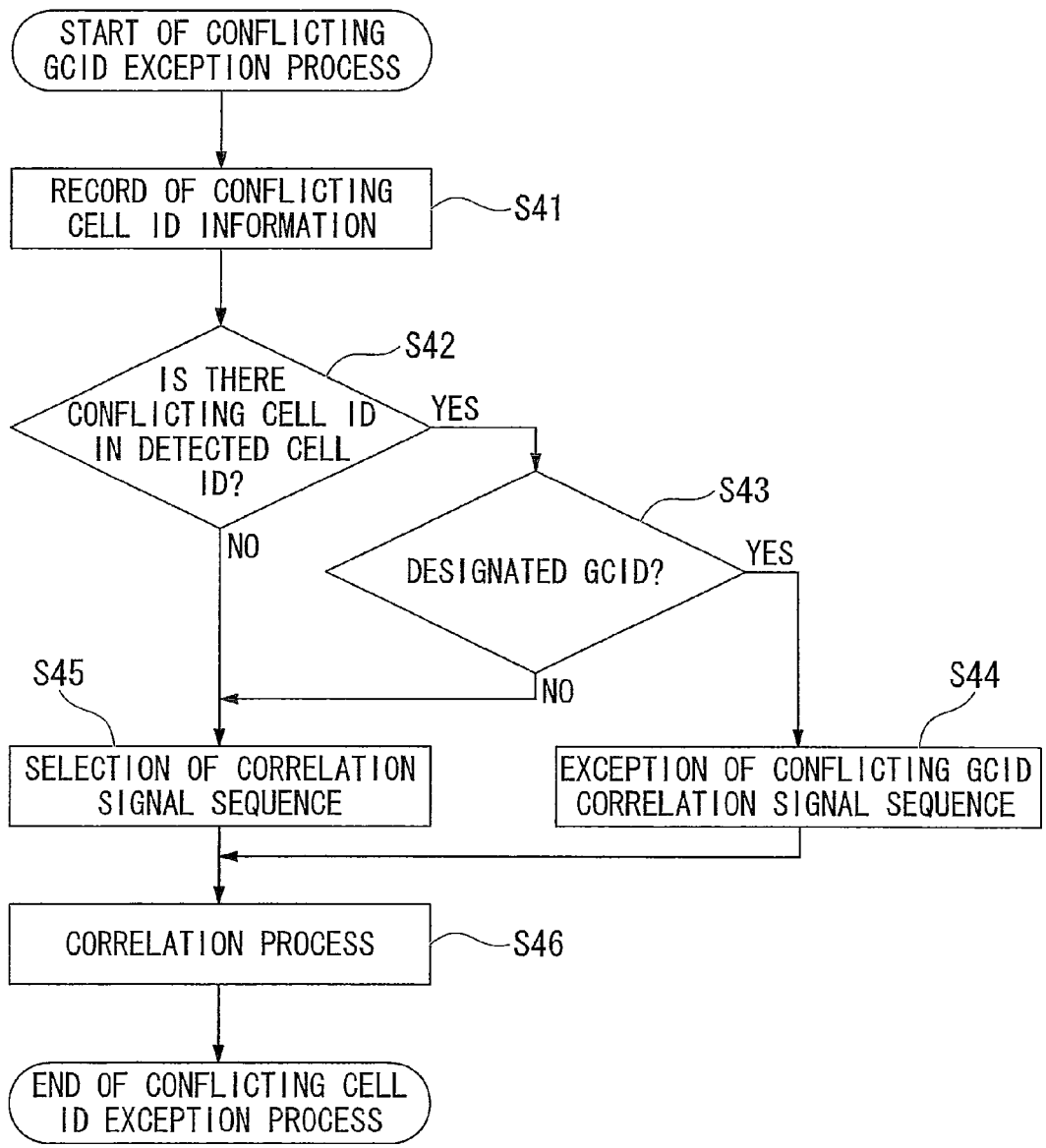
FIG. 15 is a flowchart showing a GCID exception process in a downlink reference signal processing unit of a mobile station device according to the fourth embodiment of the present invention.
Figure 16:
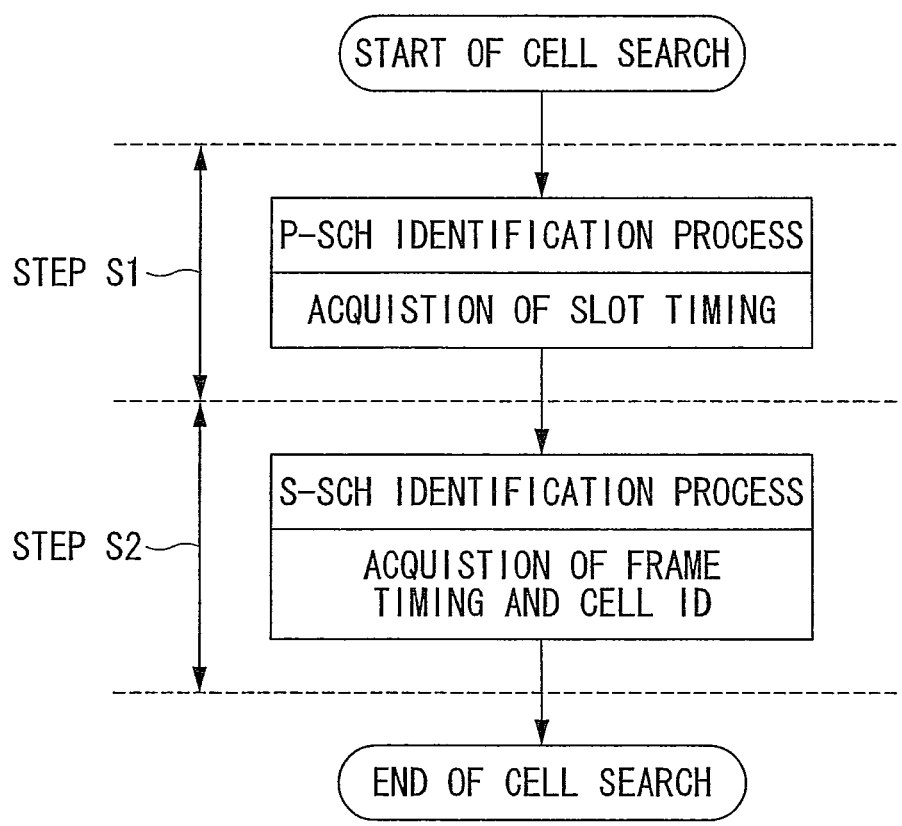
FIG. 16 is a flowchart showing a conventional cell search method.
Figure 17:
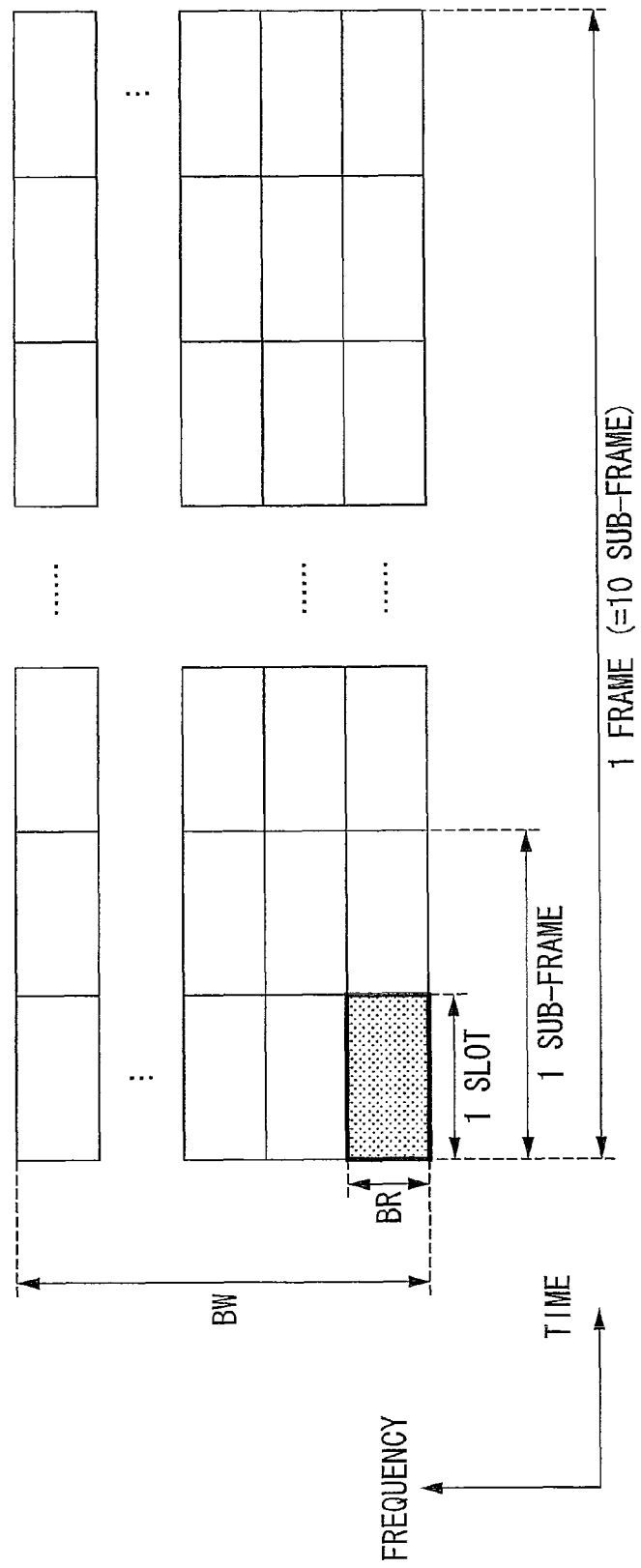
FIG. 17 is a diagram showing an example of a configuration of a radio frame in EUTRA.

FIG. 15 is a flowchart showing a GCID exception process in the downlink reference signal processing unit 107b (see FIG. 7) of the mobile station device 100 according to the fourth embodiment of the present invention. The process of FIG. 15 starts when the mobile station device 100 receives the conflicting cell ID information. First, the mobile station device 100 records the received conflicting cell ID information in the cell ID management unit 1073b (step S41).

Subsequently, it is determined whether the cell ID designated by the conflicting cell ID information (the conflicting cell ID) is included in the cell ID input to the sequence selection unit 1072b (a detected cell ID) (step S42).

When the conflicting cell ID is included ("YES" in step S42), the sequence selection unit 1072b further determines whether the conflicting cell ID is the GCID designated by the conflicting cell ID information (step S43). When the conflicting cell ID is the designated GCID ("YES" in step S43), the sequence selection unit 1072b selects the signal other than the downlink reference signal corresponding to the GCID of the conflicting cell ID (step S44).

When the conflicting cell ID is not included, or the conflicting cell ID is not the designated GCID ("NO" in step S42, and "NO" in step S43), the downlink reference signal based on the reception control signal is selected by the sequence selection unit 1072b (step S45). The correlation processing unit 1074b then correlates the selected signal of step S45 with the extracted signal of the received downlink reference signal (step S46), and outputs the correlation signal.

In addition, in the present embodiment, the mobile station device 100 may not exclude the reception quality of the cell having the GCID designated by the conflicting cell ID information, but may exclude the reception quality of the cell other than the designated GCID.

According to the present embodiment, the measurement report of the reception quality of the cell having the designated GCID among the conflicting cell IDs is not performed in the mobile station device 100. For this reason, the reception quality of the cell having the designated GCID is not used as the handover reference, and the cell of the handover destination is not designated by the handover command message.

In addition, when the mobile station device 100 has received the conflicting cell ID information, the mobile station device 100 may acquire only the GCID of the designated cell, and accordingly, a measurement processing procedure in an area without the conflicting cells may be the same as that of the normal case.

According to the present embodiment, since the base station device 200 explicitly indicates that the same cell IDs are present and conflict with each other, the mobile station device 100 need not measure the downlink reference signal of the cell having the designated GCID among the conflicting cell IDS. Accordingly, it is possible to improve the success possibility of the handover by removing uncertainty during the handover of not recognizing to which of the conflicting cells the mobile station device 100 is handed over.

In addition, the mobile station device 100 need not measure the unnecessary reception quality for the cell of the designated GCID among the conflicting cell IDs. Further, since the mobile station device 100 does not transmit the measurement report message for the cell of the designated GCID, it is possible to reduce consumption power.

In addition, in the above-described embodiments, the control of the mobile station device 100 or the base station device 200 may be performed in such a manner that a program for realizing the functions of the respective components of the mobile station device 100 or the base station device 200 according to the first to fourth embodiments is recorded in a recording medium which can be read by a computer, and the program recorded in the recording medium is read by a computer system. In addition, the "computer system" mentioned herein includes an Operating System or hardware such as peripheral devices.

The "computer-readable recording medium" includes a storage unit, including a portable medium such as a flexible disk, a magnetic optical disk, a ROM, and a CD-ROM, and a hard disk embedded in the computer system. Further, the "computer-readable recording medium" may include a medium for temporarily and dynamically storing programs, like a communication line when a program is transmitted via a network such as the Internet or a communication line such as a telephone line, and a medium for storing programs for a predetermined time, like a volatile memory inside a computer system consisting of a server and a client in that case. The program may be a program for realizing some of the above-described functions. Alternatively, the program may be a program capable of realizing the above-described functions through a combination with a program previously stored in a computer system.

While the embodiments of the present invention have been described with reference to the drawings, the detailed configuration is not limited to the embodiments, and the design and the like of the scope not departing from the spirit of the present invention are included in the scope of the claims.

INDUSTRIAL APPLICABILITY

The present invention can be applied to a mobile communication system, a base station device, a mobile station device, a mobile communication method, and the like capable of simplifying a process in the communication between the mobile station device and the base station device even when there are conflicting cells.

The invention claimed is:
1. A mobile communication system comprising:
a mobile station device,
a first base station device configured to manage a serving cell of the mobile station device, and
a second base station device configured to manage a cell of a handover destination for the mobile station device, wherein the first base station device notifies the mobile station device of first cell identification information of the second base station device to cause the mobile station device to start to receive second cell identification information used to determine a cell reported by the mobile station device as the cell of the handover destination, in a case that the cell of the handover destination for the mobile station device cannot be determined due to conflict of the first cell identification information of cell managed by the second base station device, the first cell identification information representing a combination of radio signals of a synchronization channel of the second base station device and being included in a measurement report message transmitted by the mobile station device, and the mobile station device receives the second cell identification information from the second base station device notified by the first cell identification information, and transmits, to the first base station, the measurement report message including the first cell identification information, and the second cell identification information received from the second base station device.

2. The mobile communication system according to claim 1, wherein the second cell identification information includes global cell identification information uniquely allocated to each cell transmitted via a broadcast channel of the first and second base station device.

3. The mobile communication system according to claim 1, wherein the first base station device is configured to request a handover to the second base station device of the cell of the handover destination based on the measurement report message including the second cell identification information received from the mobile station device.

4. The mobile communication system according to claim 3, wherein the second base station device is configured to determine whether conditions are satisfied for performing the handover requested by the first base station device.

5. The mobile communication system according to claim 4, wherein the first base station device is configured to transmit a handover command message to the mobile station device in a case that a handover request permission message is received from the second base station device.

6. The mobile communication system according to claim 3, wherein the first base station device is configured to transmit a handover command message to the mobile station device in a case that a handover request permission message is received from the second base station device.

7. A base station device which communicates with a mobile station device and manages a serving cell of the mobile station device, the base station device comprising:

a control unit configured to notify the mobile station device of first cell identification information of a base station device which manages a cell of a handover destination for the mobile station device, to cause the mobile station device to start to receive second cell identification information used to determine a cell reported by the mobile station device as the cell of a handover destination, in a case that the cell of the handover destination for the mobile station device cannot be determined due to conflict of the first cell identification information of cell managed as the handover destination, the first cell identification information representing a combination of radio signals of a synchronization channel of the base station device which manages the cell of the handover destination for the mobile station device and being included in a measurement report message transmitted by the mobile station device.

8. A mobile station device which communicates with a first base station device managing a serving cell of the mobile station device and a second base station device managing a cell of a handover destination for the mobile station device, the mobile station device comprising:

a control unit configured to be notified of first cell identification information of the second base station device from the base station device to start to receive second cell identification information used to determine a cell reported by the mobile station device as the cell of the handover destination, in a case that the cell of the handover destination for the mobile station device cannot be determined due to conflict of the first cell identification information of cell managed by the second base station device, the first cell identification information representing a combination of radio signals of a synchronization channel of the second base station device and being included in a measurement report message transmitted by the mobile station device, and the control unit further configured to receive the second cell identification information from the second base station device represented by the notified first cell identification information, and to transmit the measurement report message including the first cell identification and the second cell identification information received from the second base station device.

9. A mobile communication method performed by a mobile station device for communication with a first base station device which manages a serving cell of the mobile station device, and a second base station device which manages a cell of a handover destination for the mobile station device, the method comprising:

notifying, by the first base station device, the mobile station device of first cell identification information of the second base station device to cause the mobile station device to start to receive second cell identification information used to determine a cell reported by the mobile station device as the cell of the handover destination, in a case that the cell of the handover destination for the mobile station device cannot be determined due to conflict of the first cell identification information of cell managed by the second base station device, the first cell identification information representing a combination of radio signals of a synchronization channel of the second base station device, and being included in a measurement report message transmitted by the mobile station device;

receiving the second cell identification information from the second base station device represented by the notified first cell identification information, and transmitting, to the first base station device by the mobile station device, the measurement report message including the first cell identification information and the second cell identification information received from the second base station device.

* * * * *